US012584751B2

(12) United States Patent
Saito

(10) Patent No.: US 12,584,751 B2
(45) Date of Patent: Mar. 24, 2026

(54) INFORMATION PROCESSING APPARATUS AND INFORMATION PROCESSING METHOD

(71) Applicant: SONY GROUP CORPORATION, Tokyo (JP)

(72) Inventor: Mari Saito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 63 days.

(21) Appl. No.: 18/555,261

(22) PCT Filed: Feb. 15, 2022

(86) PCT No.: PCT/JP2022/006013
§ 371 (c)(1),
(2) Date: Oct. 13, 2023

(87) PCT Pub. No.: WO2022/230312
PCT Pub. Date: Nov. 3, 2022

(65) Prior Publication Data
US 2024/0200951 A1 Jun. 20, 2024

(30) Foreign Application Priority Data
Apr. 30, 2021 (JP) ................................. 2021-077241

(51) Int. Cl.
*G01C 21/20* (2006.01)
*G06F 3/01* (2006.01)
(52) U.S. Cl.
CPC ............ *G01C 21/206* (2013.01); *G06F 3/011* (2013.01)
(58) Field of Classification Search
CPC .............................. G01C 21/206; G06F 3/011
(Continued)

(56) References Cited

U.S. PATENT DOCUMENTS

| | | | | | |
|---|---|---|---|---|---|
| 9,057,617 | B1 * | 6/2015 | Lopatenko | ......... | G01C 21/3874 |
| 10,024,678 | B2 * | 7/2018 | Moore | .............. | G01C 21/1656 |

(Continued)

FOREIGN PATENT DOCUMENTS

| | | | |
|---|---|---|---|
| DE | 102015004167 A1 * | 10/2016 | |
| JP | 2008-040373 A | 2/2008 | |

(Continued)

OTHER PUBLICATIONS

International Search Report and Written Opinion of PCT Application No. PCT/JP2022/006013, issued on May 10, 2022, 08 pages of ISRWO.

(Continued)

*Primary Examiner* — Joshua E Rodden
(74) *Attorney, Agent, or Firm* — CHIP LAW GROUP

(57) ABSTRACT

A server device (corresponding to one example of "information processing apparatus") includes an acquisition unit that acquires a state of a user who appreciates an exhibit (P) (corresponding to one example of "appreciated object"), an estimation unit that estimates an appreciation pattern, which is a type of an appreciation style of the user, based on the state of the user acquired by the acquisition unit, a determination unit that determines a mode of a guide regarding the exhibit (P) presented to the user in accordance with the appreciation pattern estimated by the estimation unit, and a guide control unit that executes guide control in which control is performed such that the guide is presented to the user in accordance with the mode of the guide determined by the determination unit.

20 Claims, 18 Drawing Sheets

(58) Field of Classification Search
USPC ........................................................ 701/516
See application file for complete search history.

(56) References Cited

U.S. PATENT DOCUMENTS

| | | | |
|---|---|---|---|
| 10,612,936 B2 * | 4/2020 | Tang | G01C 21/3679 |
| 2006/0188230 A1 * | 8/2006 | An | G09B 29/008 |
| | | | 386/227 |
| 2016/0104486 A1 * | 4/2016 | Penilla | G10L 25/45 |
| | | | 704/232 |
| 2016/0203643 A1 * | 7/2016 | Kim | G06T 19/003 |
| | | | 345/633 |
| 2016/0212591 A1 * | 7/2016 | Kim | H04W 4/029 |
| 2017/0352068 A1 * | 12/2017 | Dominguez | H04W 8/005 |
| 2019/0297243 A1 * | 9/2019 | Oshima | H04N 23/73 |
| 2020/0057486 A1 * | 2/2020 | Sugihara | G06F 3/165 |
| 2020/0168222 A1 * | 5/2020 | Saito | G06Q 30/0252 |
| 2020/0320592 A1 * | 10/2020 | Soule | H04W 4/021 |
| 2022/0027751 A1 * | 1/2022 | Hatfield | H04L 67/535 |

FOREIGN PATENT DOCUMENTS

| | | | |
|---|---|---|---|
| JP | 2011-109629 A | 6/2011 |
| JP | 5090135 B2 | 12/2012 |
| JP | 2019-126033 A | 7/2019 |
| JP | 2020-057329 A | 4/2020 |

OTHER PUBLICATIONS

Kuflik Tsvi et al., "Analysis and Prediction of Museum Visitors' Behavioral Pattern Types", Jan. 1, 2012, Springer Berlin Heidelberg, ISSN: 1611-2482, pp. 161-1 76.

* cited by examiner

FIG.1
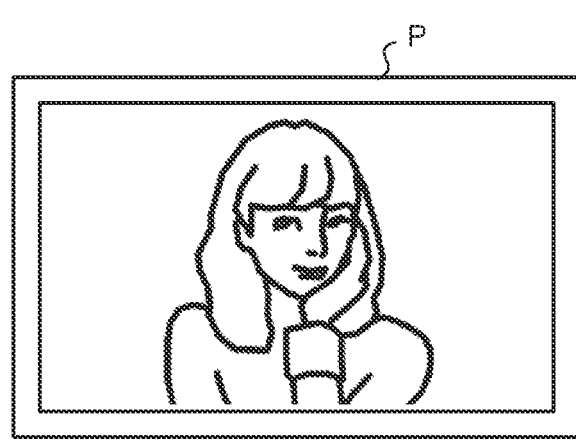
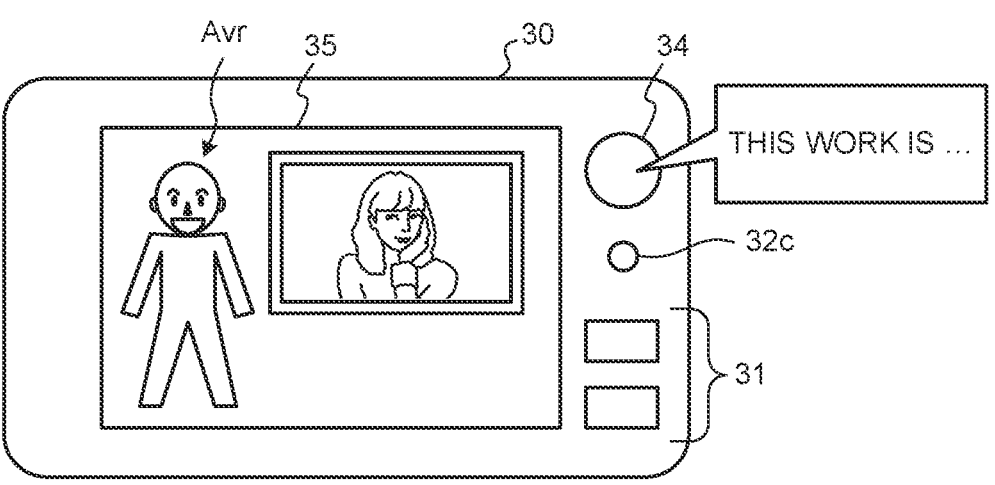

FIG.2

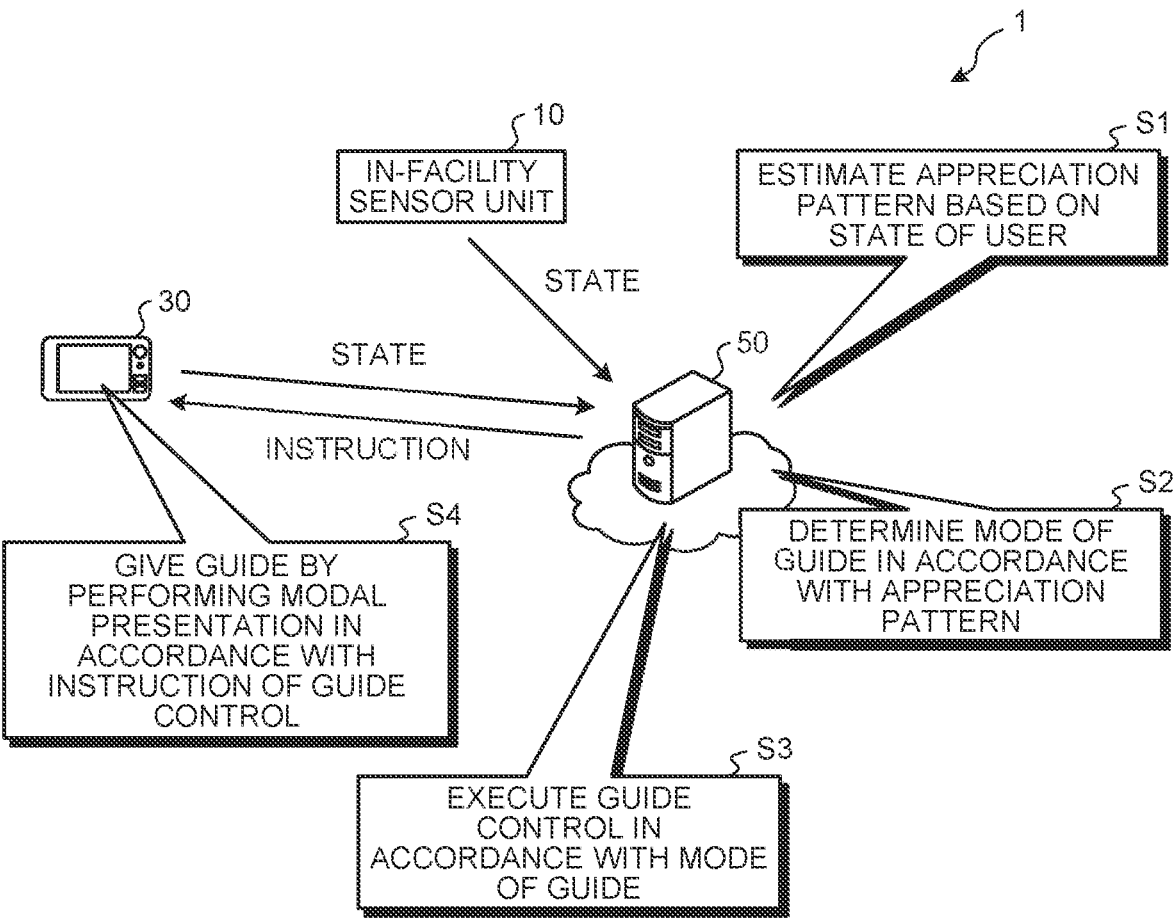

1

10
IN-FACILITY
SENSOR UNIT

STATE

S1
ESTIMATE APPRECIATION
PATTERN BASED ON
STATE OF USER

30

STATE

50

INSTRUCTION

S4
GIVE GUIDE BY
PERFORMING MODAL
PRESENTATION IN
ACCORDANCE WITH
INSTRUCTION OF GUIDE
CONTROL

S2
DETERMINE MODE OF
GUIDE IN ACCORDANCE
WITH APPRECIATION
PATTERN

S3
EXECUTE GUIDE
CONTROL IN
ACCORDANCE WITH MODE
OF GUIDE

FIG.3

| APPRECIATION PATTERN |
|---|
| A (Ant) |
| G (Grasshopper) |
| F (Fish) |
| B (Butterfly) |

FIG.13

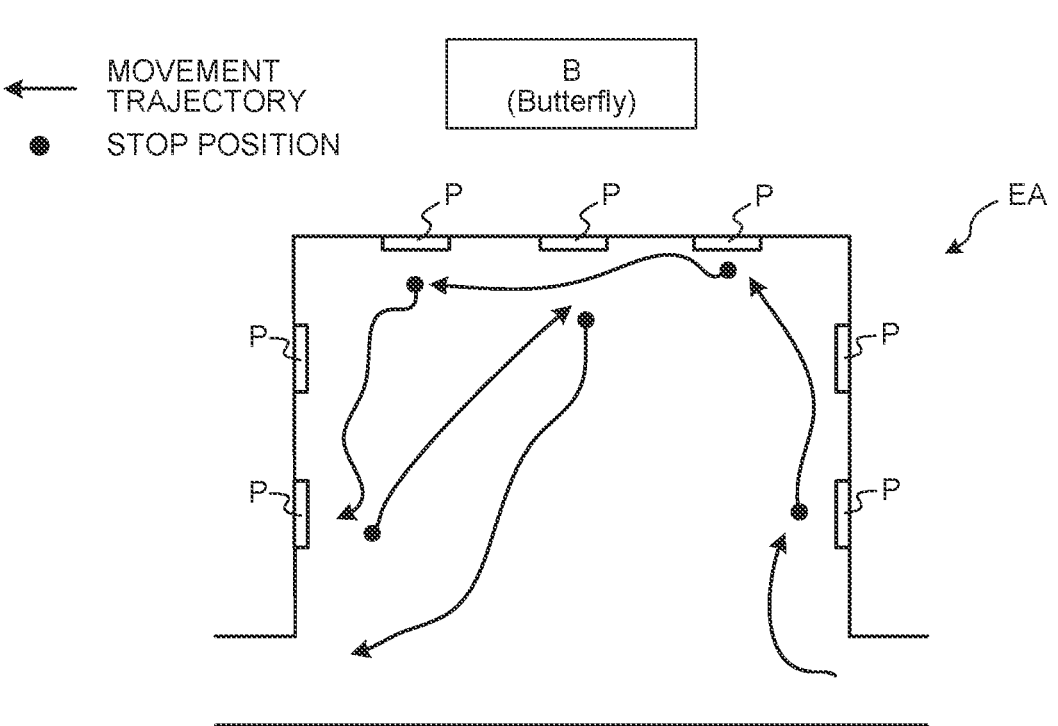

MOVEMENT TRAJECTORY

STOP POSITION

B (Butterfly)

| APPRECIATION PATTERN | MODE OF GUIDE | RECOMMEN-DATION |
|---|---|---|
| A | ·ALL EXHIBITS ARE EXPLAINED IN DETAIL<br>·DEGREE OF DETAIL IS CHANGED IN ACCORDANCE WITH SPEED OF MOVEMENT | NOTHING |
| G | ·ONLY EXHIBIT AT POSITION WHERE USER HAS STOPPED IS EXPLAINED | RELATED EXHIBIT |
| F | ·SCHEMATIC EXPLANATION IS PRIORITIZED OVER DETAILED EXPLANATION | EXHIBIT TO BE LOOKED AT NEXT |
| B | ·SIMPLE EXPLANATION<br>·WHEN STOP CONTINUES, EXPLANATION IS DETAILED | GENERAL-PURPOSE RECOMMEN-DATION OR NOTHING |

FIG.17

| GUIDE TYPE | PRESENTED MODE | SUPPLEMENTARY MODE | ADAPTATION PATTERN |
|---|---|---|---|
| WORK EXPLA-NATION | VOICE | TEXT, SYMBOL | A |
| FLOOR GUIDANCE | AVATAR | OTHER THAN AVATAR | F |
| COMPANION APPRECIA-TION | AVATAR | - | G |
| REQUEST RESPONSE | AVATAR | - | B |

FIG.18

| ORGANIZER INTENTION | PRESENTED MODE |
|---|---|
| NOTABLE WORK | VOICE |

FIG.19

| IMPAIRMENT TYPE | PRESENTED MODE |
|---|---|
| VISUAL IMPAIRMENT | VOICE |
| HEARING IMPAIRMENT | OTHER THAN VOICE |

FIG.20

| PREDETERMINED PRESENTED MODE | REACTION | PROCESSING |
|---|---|---|
| VOICE | O | CONTINUE |
| | × | SWITCH TO OTHER THAN VOICE |
| OTHER THAN VOICE | O | CONTINUE |
| | × | SWITCH TO VOICE |

LEADING BASED ON DEGREE OF CONGESTION #1
·"IT IS GOOD TO LOOK FROM DISTANCE"
·COMPARISON AND EXPLANATION IN STATE IN WHICH USER U IS IN CENTRAL PORTION AND THE LIKE

LEADING FROM A TO F

LEADING BASED ON DEGREE OF CONGESTION #2
·"COME CLOSE AND LOOK AT BRUSHWORK"
·CAUSE USER U TO COMPARE PLURALITY OF WORKS WHILE APPROACHING EXHIBIT P AND THE LIKE

LEADING FROM F TO A OR G

LEADING BASED ON DEGREE OF CONGESTION #3
·"FIRST, LOOK AT NEXT EXHIBITION ROOM" AND THE LIKE

LEADING FROM A TO G

·I WANT TO LOOK AT EXHIBITS P AROUND HERE
·I WANT TO LOOK AT EXHIBITS P IN THAT AREA
·I WANT TO LOOK AT EXHIBITS P OF THIS ERA
⋮

LEADING TO CENTRAL PORTION

LEADING TO VICINITY OF EXHIBIT

Avr-o

35

Avr-e

VISUALIZE AVATAR OF ANOTHER
GUIDE TERMINAL AND MOVEMENT
THEREOF

35

P

Avr

DETERIORATE VISIBILITY OF AVATAR
·REDUCTION, BRIGHTNESS REDUCTION,
INVISIBILITY, POSITION MOVEMENT, AND THE
LIKE

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2022/006013 filed on Feb. 15, 2022, which claims priority benefit of Japanese Patent Application No. JP 2021-077241 filed in the Japan Patent Office on Apr. 30, 2021. Each of the above-referenced applications is hereby incorporated herein by reference in its entirety.

FIELD

The present disclosure relates to an information processing apparatus and an information processing method.

BACKGROUND

There has been known a guide system that gives a guide regarding exhibits and the interior of a facility by using voice information and image information to a facility user (hereinafter, appropriately referred to as "user") in an exhibit appreciation facility such as an art gallery and a museum.

Such a guide system includes a device that automatically reproduces a voice guide regarding an exhibit in accordance with a position of the user with respect to the exhibit (e.g., see Patent Literature 1).

CITATION LIST

Patent Literature

Patent Literature 1: JP 2011-109629 A

SUMMARY

Technical Problem

The above-described conventional technique, however, has room for further improvement in giving a guide in accordance with the state and preference of the user.

Specifically, when the above-described conventional technique is used, a voice guide for an exhibit may be automatically reproduced even when the user is close to the exhibit but is not actually appreciating the exhibit.

In this regard, for example, automatic reproduction only in a case where the user is in an appreciation state can be performed by considering, for example, an orientation of the face and a line of sight of the user. Note, however, that, in general, only the same explanation may be able to be given to users having different appreciation styles and preferences, or redundant explanations may be given for an exhibit which the user is not interested in.

Thus, the present disclosure proposes an information processing apparatus and an information processing method capable of giving a guide in accordance with the state and preference of the user.

Solution to Problem

In order to solve the above problems, one aspect of an information processing apparatus according to the present disclosure includes: an acquisition unit that acquires a state of a user who appreciates an appreciated object; an estimation unit that estimates an appreciation pattern, which is a type of an appreciation style of the user, based on the state of the user acquired by the acquisition unit; a determination unit that determines a mode of a guide regarding the appreciated object presented to the user in accordance with the appreciation pattern estimated by the estimation unit; and a guide control unit that executes guide control in which control is performed such that the guide is presented to the user in accordance with the mode of the guide determined by the determination unit.

BRIEF DESCRIPTION OF DRAWINGS

FIG. 1 is a schematic configuration diagram of a guide terminal according to an embodiment of the present disclosure.

FIG. 2 is an outline explanatory diagram of an information processing method according to the embodiment of the present disclosure.

FIG. 3 illustrates one example of appreciation patterns.

FIG. 13 is an explanatory diagram of an appreciation pattern "B".

FIG. 14 is an explanatory diagram of modes of guides for different appreciation patterns.

FIG. 17 is an explanatory diagram of modal presentation control based on guide types.

FIG. 18 is an explanatory diagram of the modal presentation control based on an organizer intention.

FIG. 19 is an explanatory diagram (part 1) of accessibility support.

FIG. 20 is an explanatory diagram (part 2) of the accessibility support.

DESCRIPTION OF EMBODIMENTS

Figure 4:
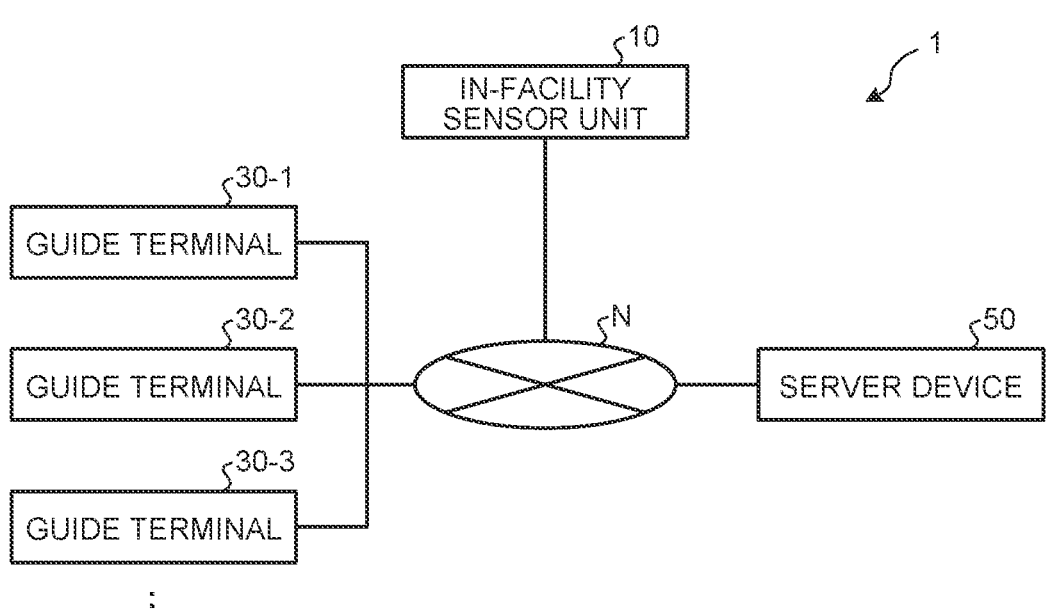
FIG. 4 illustrates a configuration example of a guide system according to the embodiment of the present disclosure.

An embodiment of the present disclosure will be described in detail below with reference to the drawings. Note that, in the following embodiment, the same reference signs are attached to the same parts to omit duplicate description.

Furthermore, in the present specification and the drawings, a plurality of components having substantially the same functional configuration may be distinguished by attaching hyphenated different numbers after the same reference signs. For example, a plurality of configurations having substantially the same functional configuration is distinguished as a guide terminal 30-1 and a guide terminal 30-2, as necessary. Note, however, that, when it is unnecessary to particularly distinguish a plurality of components having substantially the same functional configuration, only the same reference signs are attached. For example, when it is unnecessary to particularly distinguish the guide terminal 30-1 and the guide terminal 30-2, the guide terminal 30-1 and the guide terminal 30-2 are simply referred to as guide terminals 30.

Furthermore, the present disclosure will be described in accordance with the following item order.

1. Outline of Embodiment of Present Disclosure
2. Configuration of Information Processing System
2-1. Overall Configuration
2-2. Configuration of Guide Terminal
2-3. Configuration of Server Device
2-4. Modal Presentation Control
2-5. Accessibility Support
2-6. Processing Procedure
3. Variations
3-1. Content Accumulation of Guide Terminal
3-2. Leading to Appreciation Pattern
3-3. Utterance Instruction Support
3-4. Timing of Switching Mode of Guide
3-5. Avatar
4. Hardware Configuration
5. Conclusion

1. Outline of Embodiment of Present Disclosure

First, an outline of an information processing method according to the embodiment of the present disclosure will be described. FIG. 1 is a schematic configuration diagram of a guide terminal 30 according to the embodiment of the present disclosure. Furthermore, FIG. 2 is an outline explanatory diagram of the information processing method according to the embodiment of the present disclosure. Furthermore, FIG. 3 illustrates one example of appreciation patterns.

A schematic configuration of the guide terminal 30 according to the embodiment of the present disclosure will be described. The guide terminal 30 is a terminal device that is lent to a user, for example, at the time of entrance to an exhibit appreciation facility (hereinafter, simply referred to as "facility") such as an art gallery and a museum and carried by the user in the facility.

Furthermore, the guide terminal 30 presents guide information on an exhibit P approached by the user, floor guidance, and the like to the user by using voice information and image information. The guide information on the exhibit P is, for example, work explanation. The guide information on floor guidance includes a place of each exhibition area and a movement route.

As illustrated in FIG. 1, the guide terminal 30 includes an operation unit 31, a microphone 32$c$, a voice output unit 34, and a display unit 35. The operation unit 31 receives various instruction operations from the user. The microphone 32$c$ receives the contents of a user utterance. The guide terminal 30 can also receive an instruction operation given by a user utterance via the microphone 32$c$.

The voice output unit 34 is, for example, a speaker, and outputs guide information using voice as a user interface. Note that the voice output unit 34 may be earphones, a headphone, and the like.

The display unit 35 is, for example, a display, and outputs guide information based on an image. The guide information based on an image can be presented to the user by using, for example, text, a symbol, or an avatar Avr in FIG. 1 as a user interface. Note that the display unit 35 may be implemented by a touch panel display, and integrated with the operation unit 31.

Furthermore, the guide terminal 30 may be a portable terminal such as a smartphone owned by the user himself/ herself. In such a case, the user installs and operates a dedicated guide application, for example, before or at the time of entering the facility to cause the portable terminal of the user himself/herself function as the guide terminals 30 in the facility.

Furthermore, the guide terminal 30 may be a wearable terminal. In such a case, the guide terminal 30 is, for example, augmented reality (AR) glasses, and the user wears the AR glasses in the facility.

By the way, an existing technique using a terminal device such as the guide terminal 30 has room for further improvement in giving a guide in accordance with the state and preference of the user.

Specifically, when a voice guide regarding the exhibit P approached by the user is automatically reproduced, a voice guide regarding the exhibit P may be automatically reproduced in the existing technique even when the user is close to the exhibit P but is not actually appreciating the exhibit P.

In this regard, for example, automatic reproduction only in a case where the user is in an appreciation state can be performed by considering, for example, an orientation of the face and a line of sight of the user. Note, however, that, in general, only the same explanation may be able to be given to users having different appreciation styles and preferences, or redundant explanations may be given for an exhibit which the user is not interested in.

Thus, in the information processing method according to the embodiment, an information processing system 1 executes guide control. In the guide control, the information processing system 1 acquires the state of a user who appreciates the exhibit P, estimates an appreciation pattern, which is a type of an appreciation style of the user, based on the acquired state of the user, determines a mode of a guide related to the exhibit P to be presented to the user in accordance with the estimated appreciation pattern, and performs control such that a guide is presented to the user in accordance with the determined mode of the guide. As illustrated in FIG. 2, the information processing system 1 includes an in-facility sensor unit 10, one or more guide terminals 30, and a server device 50.

Specifically, in the information processing method according to the embodiment, the server device 50 first appropriately acquires the state of the user from the in-facility sensor unit 10 and the guide terminal 30. The state of the user includes behaviors of appreciation actions of the user, which represent the appreciation style and preference of the user. Then, the server device 50 estimates the appreciation pattern of the user based on the acquired state of the user (Step S1).

The "appreciation patterns" here are types of the appreciation style of the user. In the embodiment of the present disclosure, as illustrated in FIG. 3, the appreciation patterns are classified into at least four types of "Ant (A)", "Grasshopper (G)", "Fish (F)", and "Butterfly (B)". The classification is based on a known paper saying that appreciation actions can be classified into approximately four patterns (Veron & Levasseur, 1989). Details of each pattern will be described later with reference to FIGS. 9 to 13.

Then, the server device 50 determines the mode of the guide to the user in accordance with the estimated appreciation pattern (Step S2). Then, the server device 50 executes guide control on each guide terminal 30 in accordance with the determined mode of the guide (Step S3). The "guide control" here includes control of what is used as a user interface for presenting the guide information, in other words, modal presentation control.

Then, the guide terminal 30 gives a guide to the user by performing modal presentation in accordance with an instruction of the guide control (Step S4).

As described above, in the information processing method according to the embodiment, guide control is executed. In the guide control, the state of a user who appreciates the exhibit P is acquired, an appreciation pattern, which is a type of an appreciation style of the user is estimated, based on the acquired state of the user, a mode of a guide related to the exhibit P to be presented to the user is determined in accordance with the estimated appreciation pattern, and control is performed such that a guide is presented to the user in accordance with the determined mode of the guide.

Therefore, according to the information processing method of the embodiment, a guide can be given in accordance with the state and preference of the user.

A configuration example of the information processing system 1 to which the information processing method according to the above-described embodiment is applied will be more specifically described below.

2. Configuration of Information Processing System

<2-1. Overall Configuration>

Figure 5:
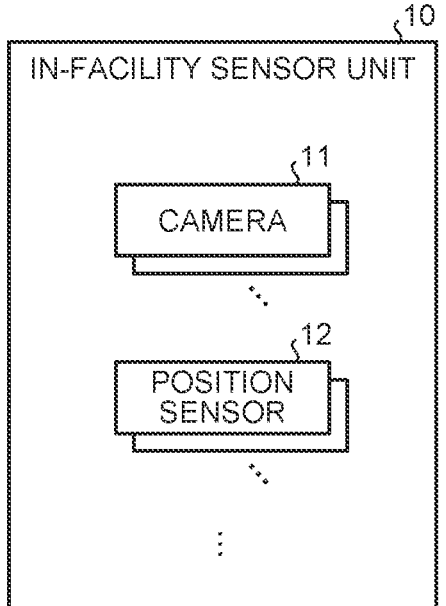
FIG. 5 is a block diagram illustrating a configuration example of an in-facility sensor unit.

FIG. 4 illustrates a configuration example of the information processing system 1 according to the embodiment of the present disclosure. Furthermore, FIG. 5 is a block diagram illustrating a configuration example of the in-facility sensor unit 10. Note that FIGS. 4 and 5 and FIGS. 6 to 8 to be presented later illustrate only components necessary for describing the features of the embodiment, and descriptions of common components are omitted.

In other words, components in FIGS. 4 to 8 are functional and conceptual, and are not necessarily required to be physically configured as illustrated. For example, the specific form of distribution/integration of each block is not limited to the illustrated one, and all or a part of the block can be configured in a functionally or physically distributed/integrated manner in any unit in accordance with various loads and use situations.

Furthermore, in description with reference to FIGS. 4 to 8, descriptions of the already described components may be simplified or omitted.

As described above, as illustrated in FIG. 4, the information processing system 1 includes the in-facility sensor unit 10, one or more guide terminals 30, and the server device 50. Furthermore, as illustrated in FIG. 4, the in-facility sensor unit 10, the guide terminal 30, and the server device 50 are mutually connected by a network N such as the Internet, an intranet, a mobile phone network, and a short-range wireless communication network, and can mutually transmit and receive data via the network N.

The in-facility sensor unit 10 is a group of various sensors provided at various places in a facility. As illustrated in FIG. 5, the in-facility sensor unit 10 includes one or more cameras 11 and one or more position sensors 12. Of course, other sensors, for example, a sensor that detects an orientation of the face and a line of sight of the user and the like may be included. In the embodiment of the present disclosure, the orientation of the face and the line of sight of the user and the like can be detected as a result of analyzing an image captured by a camera 11 and an image captured by an in-terminal sensor unit 32 to be described later.

The description returns to FIG. 4. As described above, the guide terminal 30 is a terminal device carried or worn by the user in the facility. In addition to the above-described portable terminal and wearable terminal, the guide terminal 30 may be a notebook PC, a tablet terminal, a personal digital assistant (PDA), or the like.

The guide terminal 30 appropriately transmits the state of the user to the server device 50, and gives a guide to the user based on an instruction related to the guide control from the server device 50 in the mode of the guide in accordance with the instruction.

The server device 50 is implemented as, for example, a cloud server, and appropriately acquires the state of the user from the in-facility sensor unit 10 and the guide terminal 30. Then, the server device 50 estimates the appreciation pattern of the user based on the acquired state of the user, and determines the mode of the guide for each user in accordance with the estimated appreciation pattern. Then, the server device 50 executes guide control on the guide terminal 30 in accordance with the determined mode of the guide.

<2-2. Configuration of Guide Terminal>

Figure 6:
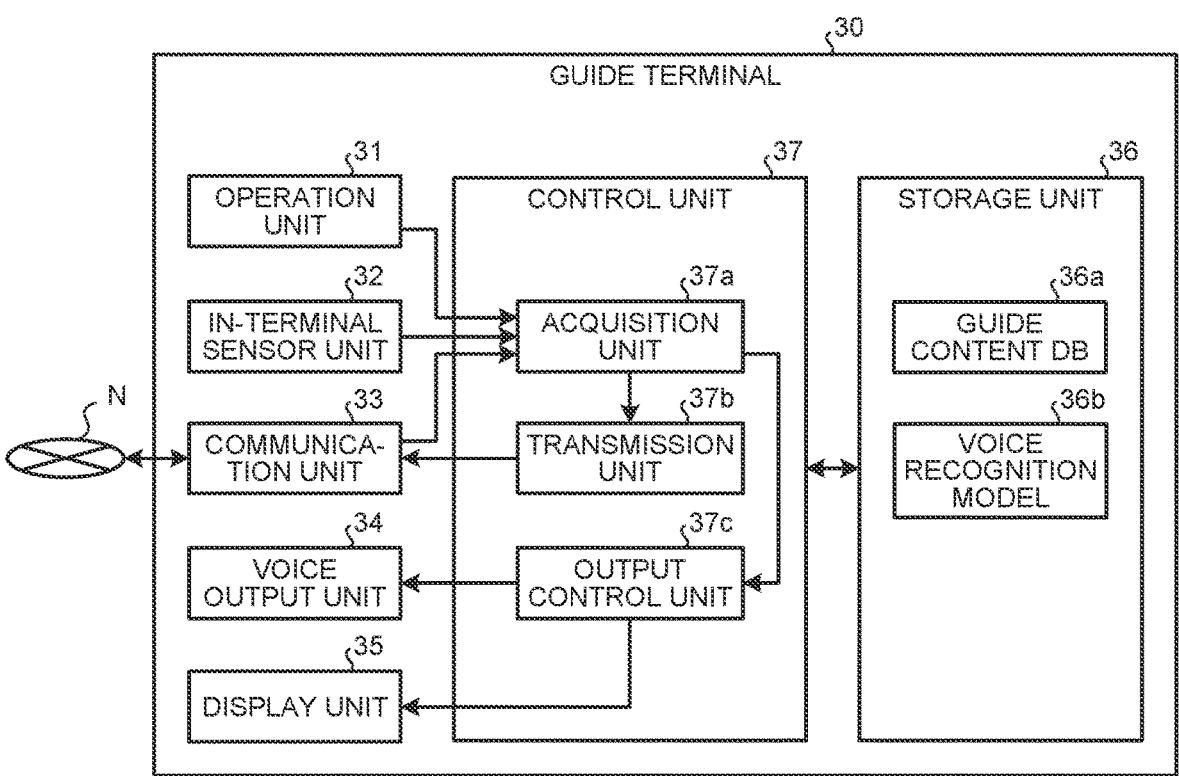
FIG. 6 is a block diagram illustrating a configuration example of a guide terminal according to the embodiment of the present disclosure.
Figure 7:
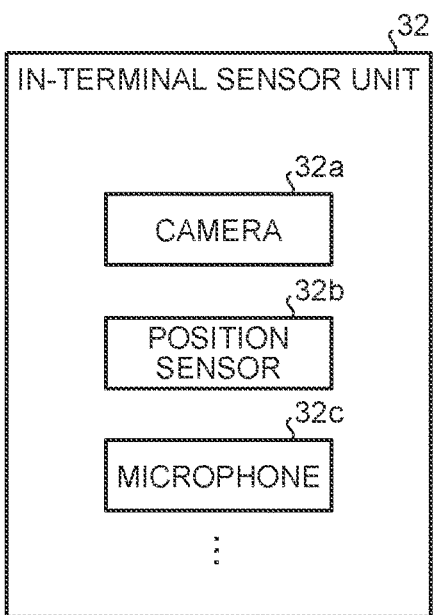
FIG. 7 is a block diagram illustrating a configuration example of an in-terminal sensor unit.

Next, FIG. 6 is a block diagram illustrating a configuration example of the guide terminal 30 according to the embodiment of the present disclosure. Furthermore, FIG. 7 is a block diagram illustrating a configuration example of the in-terminal sensor unit 32.

As illustrated in FIG. 6, the guide terminal 30 includes the operation unit 31, the in-terminal sensor unit 32, a communication unit 33, the voice output unit 34, the display unit 35, a storage unit 36, and a control unit 37. Since the operation unit 31, the voice output unit 34, and the display unit 35 have already been described, the descriptions thereof are omitted here.

The in-terminal sensor unit 32 is a group of various sensors provided in the guide terminal 30. As illustrated in FIG. 7, the in-terminal sensor unit 32 includes a camera 32a, a position sensor 32b, and the microphone 32c. Of course, other sensors such as an acceleration sensor and a gyro sensor may be included.

The description returns to FIG. 6. The communication unit 33 is implemented by, for example, a network interface card (NIC). The communication unit 33 is wirelessly connected to the server device 50 via the network N, and transmits and receives various pieces of information to and from the server device 50.

The storage unit 36 is implemented by, for example, a semiconductor memory element, such as a random access memory (RAM), a read only memory (ROM), and a flash memory, or a storage device, such as a hard disk and an optical disk.

In the example in FIG. 6, the storage unit 36 stores a guide content DB 36a and a voice recognition model 36b. The guide content DB 36a is a database of pieces of guide content to be presented to the user via the voice output unit 34 and the display unit 35. The voice recognition model 36b is a recognition model for recognizing the contents of a user utterance input via the microphone 32c.

The control unit 37 is a controller, and is implemented by, for example, a central processing unit (CPU) and a micro processing unit (MPU) executing various programs (not illustrated) stored in the storage unit 36 using a RAM as a work area. Furthermore, the control unit 37 can be implemented by an integrated circuit such as an application specific integrated circuit (ASIC) and a field programmable gate array (FPGA).

The control unit 37 includes an acquisition unit 37a, a transmission unit 37b, and an output control unit 37c. The control unit 37 implements or executes functions and effects of information processing described below.

The acquisition unit 37a acquires an instruction operation of the user via the operation unit 31 and the microphone 32c, and causes the output control unit 37c to perform output control in accordance with the instruction operation. Furthermore, the acquisition unit 37a acquires the states of the guide terminal 30 and the user from the in-terminal sensor unit 32, and causes the transmission unit 37b to transmit the states to the server device 50.

Furthermore, the acquisition unit 37a acquires an instruction related to the guide control from the server device 50 via the communication unit 33, and causes the output control unit 37c to perform output control for giving a guide to the user in accordance with the instruction.

The transmission unit 37b appropriately transmits the states of the guide terminal 30 and the user acquired by the acquisition unit 37a to the server device 50 via the communication unit 33.

The output control unit 37c performs output control on the voice output unit 34 and the display unit 35 in accordance with the instruction operation of the user acquired by the acquisition unit 37a. Furthermore, the output control unit 37c performs output control on the voice output unit 34 and the display unit 35 in accordance with the instruction related to the guide control from the server device 50 acquired by the acquisition unit 37a.

<2-3. Configuration of Server Device>

Figure 8:
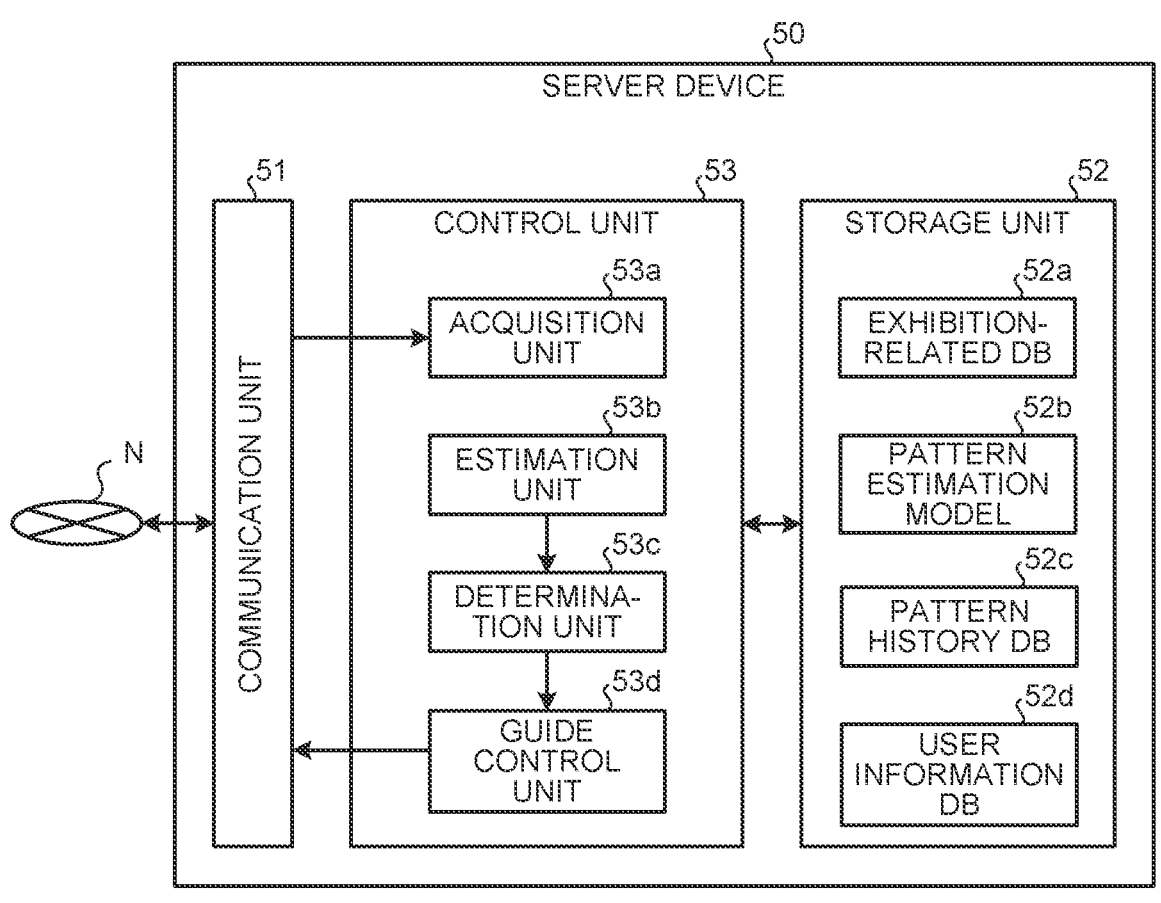
FIG. 8 is a block diagram illustrating a configuration example of a server device according to the embodiment of the present disclosure.

Next, FIG. 8 is a block diagram illustrating a configuration example of the server device 50 according to the embodiment of the present disclosure. As illustrated in FIG. 8, the server device 50 includes a communication unit 51, a storage unit 52, and a control unit 53.

Similarly to the above-described communication unit 33, the communication unit 51 is implemented by, for example, an NIC. The communication unit 51 is connected to the in-facility sensor unit 10 and the guide terminal 30 via the network N by wire or wirelessly, and transmits and receives various pieces of information to and from the in-facility sensor unit 10 and the guide terminal 30.

Similarly to the above-described storage unit 36, the storage unit 52 is implemented by, for example, a semiconductor memory element, such as a RAM, a ROM, and a flash memory, or a storage device, such as a hard disk and an optical disk.

In the example in FIG. 8, the storage unit 52 stores an exhibition-related DB 52a, a pattern estimation model 52b, a pattern history DB 52c, and a user information DB 52d. The exhibition-related DB 52a is a database of piece of information related to exhibition of the exhibit P. The information related to the exhibition of the exhibit P includes, for example, an exhibit ID, a facility map, guide content, and other related content.

The pattern estimation model 52b is an estimation model that estimates the appreciation pattern of the user based on the states of the user and the guide terminal 30 acquired from the in-facility sensor unit 10 and the guide terminal 30. The pattern estimation model 52b is generated as a learning model using an algorithm of machine learning such as deep learning. In such a case, for example, when the state of the user acquired by an acquisition unit 53a to be described later is input, the pattern estimation model 52b outputs the estimated appreciation pattern and the accuracy thereof.

The pattern history DB 52c is information on a history of appreciation patterns estimated in the past by an estimation unit 53b to be described later. The user information DB 52d is information on the attribute of the user and the like, and includes, for example, an impairment type indicating that the user is visually impaired or hearing impaired.

Similarly to the above-described control unit 37, the control unit 53 is a controller. The control unit 53 is implemented by, for example, a CPU and an MPU executing various programs (not illustrated) stored in the storage unit 52 using a RAM as a work area. Furthermore, the control unit 53 can be implemented by an integrated circuit such as an ASIC and an FPGA.

The control unit 53 includes the acquisition unit 53a, the estimation unit 53b, a determination unit 53c, and a guide control unit 53d. The control unit 53 implements or executes functions and effects of information processing to be described below.

The acquisition unit 53a acquires the state of the user transmitted from the in-facility sensor unit 10 and the guide terminal 30 via the communication unit 51. The estimation unit 53b estimates the appreciation pattern of the user based on the state of the user acquired by the acquisition unit 53a. Note that the estimation unit 53b analyzes the acquired state of the user by performing image analysis or the like, as necessary. Furthermore, the estimation unit 53b estimates the appreciation pattern of the user based on a movement trajectory, a distance to the exhibit P, and the like obtained as a result of the analysis.

Figure 9:
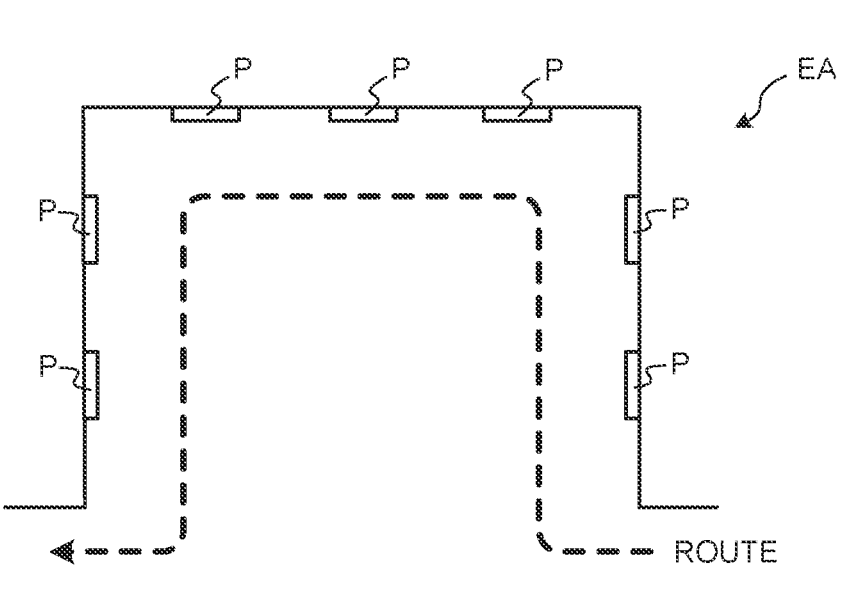
FIG. 9 is a schematic plan view illustrating one example of an exhibition area.
Figure 10:
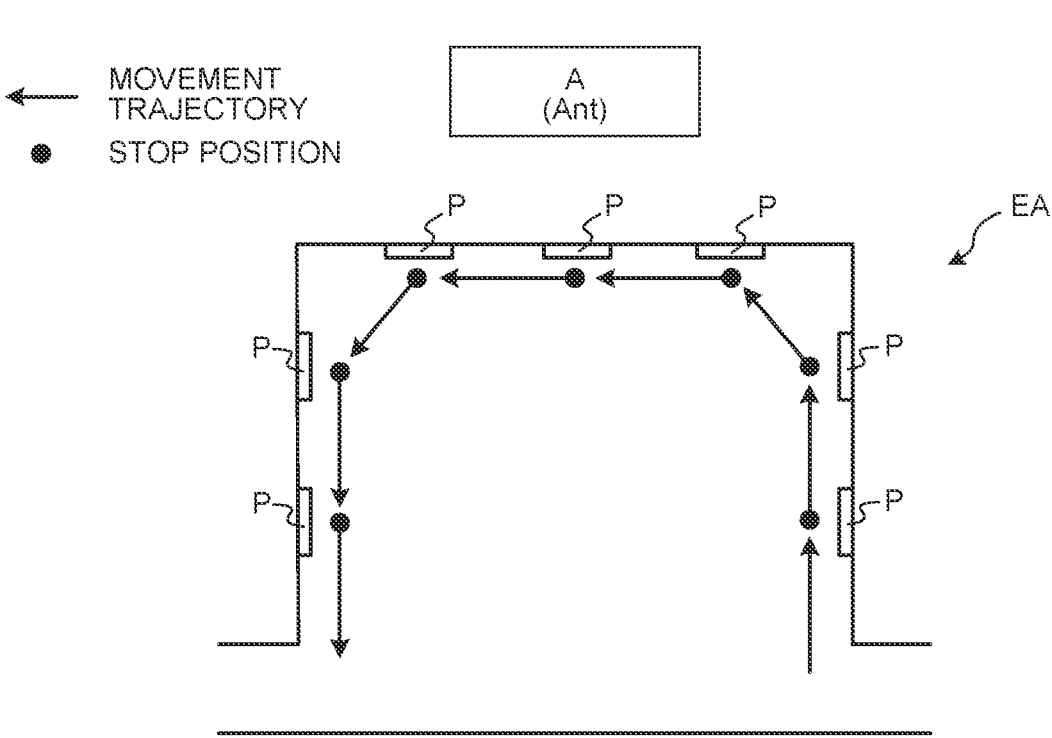
FIG. 10 is an explanatory diagram of an appreciation pattern "A".
Figure 11:
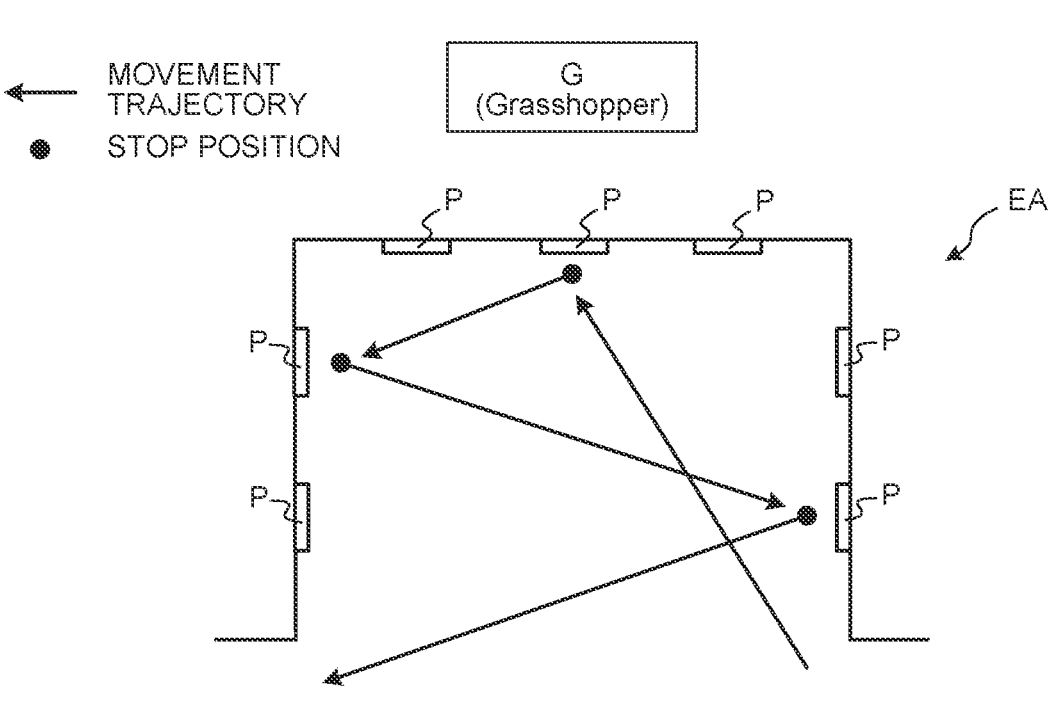
FIG. 11 is an explanatory diagram of an appreciation pattern "G".
Figure 12:
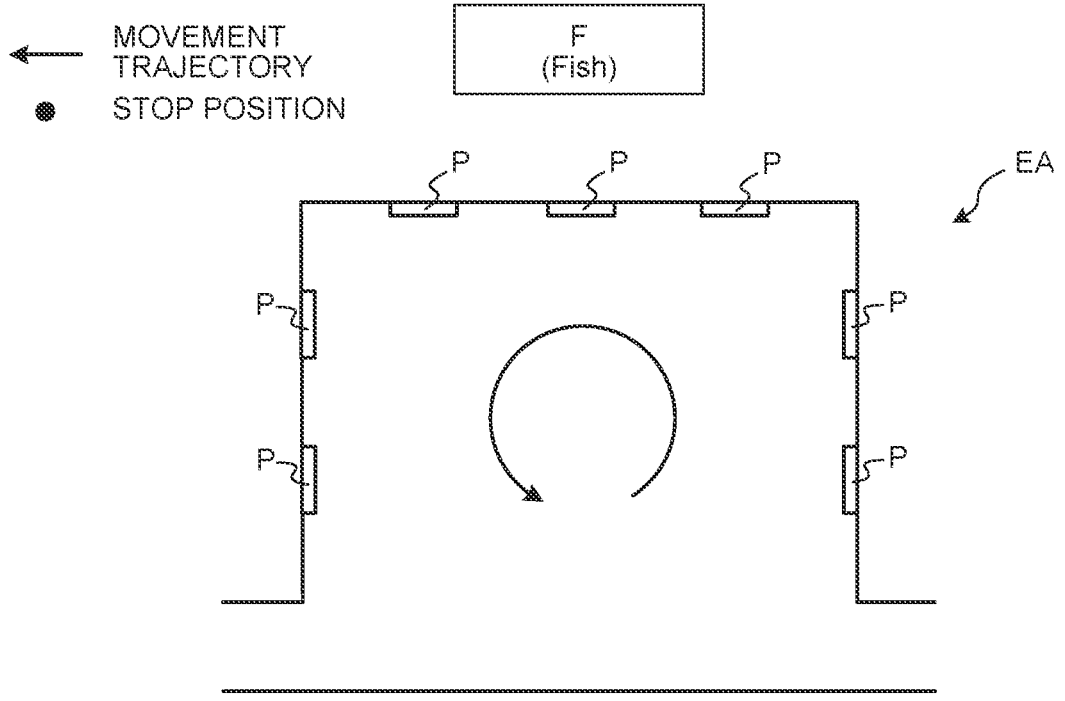
FIG. 12 is an explanatory diagram of an appreciation pattern "F".

Here, the appreciation pattern according to the embodiment of the present disclosure will be specifically described. FIG. 9 is a schematic plan view illustrating one example of the exhibition area. Furthermore, FIG. 10 is an explanatory diagram of an appreciation pattern "A". FIG. 11 is an explanatory diagram of an appreciation pattern "G". FIG. 12 is an explanatory diagram of an appreciation pattern "F". FIG. 13 is an explanatory diagram of an appreciation pattern "B".

As illustrated in FIG. 9, there is an exhibition area EA in which exhibits P are exhibited on three surfaces of a square room. Furthermore, in the exhibition area EA, a route is indicated by a dashed arrow.

In the exhibition area EA, as illustrated in FIG. 10, in the appreciation pattern "A", the user tends to relatively approach the exhibit P, to faithfully appreciate the exhibit P like an ant along the route while reading a description, and not to cross space.

Furthermore, as illustrated in FIG. 11, in the appreciation pattern "G", the user tends to move in the exhibition area EA as if a grasshopper repeats hopping and appreciate only the exhibit P which the user is interested in.

Furthermore, as illustrated in FIG. 12, in the appreciation pattern "F", the user tends to draw a circular movement trajectory in a central portion of the exhibition area EA like a fish, to have little appreciation time, and not to stop.

Furthermore, as illustrated in FIG. 13, in the appreciation pattern "B", the user tends to appreciate the exhibit P which has accidentally attracted the user and draw an unpredictable movement trajectory like a butterfly.

The estimation unit 53b inputs the state of the user acquired by the acquisition unit 53a to the pattern estimation model 52b, and receives a label value of one of the four types and the accuracy thereof from the pattern estimation model 52b.

Then, when the accuracy is equal to or more than a predetermined threshold, the estimation unit 53b estimates an appreciation pattern corresponding to the received label value as the appreciation pattern of the corresponding user. Furthermore, when the accuracy is less than the predetermined threshold, the estimation unit 53b estimates an appreciation state of the user. Note that, in the case, one of the four types of appreciation patterns may be regarded as being adopted. In the embodiment of the present disclosure, when the accuracy is less than the predetermined threshold, for example, the appreciation pattern "B" is uniformly regarded as being adopted.

Furthermore, when there is a certain number or more of users who are in an appreciation state obviously different from the four types, a new appreciation pattern may be added. The obviously different appreciation state is, for example, a case where the user appreciates the exhibit P without approaching the exhibit P, returns to the route, and approaches and appreciates only some exhibits P.

Furthermore, in a case of a group that takes the same action, the estimation unit 53b may estimate the appreciation pattern based on the state of any one (e.g., leader) in the group, and regard all members in the group as having the same appreciation pattern. In such a case, the determination unit 53c to be described later determines the same one guide mode for all the members in the group in accordance with the appreciation pattern.

The description returns to FIG. 8. The determination unit 53c determines the mode of the guide to the corresponding user in accordance with the appreciation pattern estimated by the estimation unit 53b. Here, the modes of the guide for different appreciation patterns will be described. FIG. 14 is an explanatory diagram of the modes of guides for different appreciation patterns.

As illustrated in FIG. 14, for example, in a case of the appreciation pattern "A", the determination unit 53c determines the mode of the guide such that all the exhibits P are explained in detail for the corresponding user. Furthermore, the determination unit 53c determines the mode of the guide such that a degree of detail is changed in accordance with a speed of movement of the user, for example, such that, as a movement speed is reduced, explanation is more detailed. Furthermore, in the case of the appreciation pattern "A", the determination unit 53c determines the mode of the guide such that the exhibit P and the like to be looked at next are not recommended.

Furthermore, for example, in a case of the appreciation pattern "G", the determination unit 53c determines the mode of the guide such that only the exhibit P at a position where the user has stopped is explained for the corresponding user. Furthermore, in the case of the appreciation pattern "G", the determination unit 53c determines the mode of the guide such that a related exhibit and the like that have not been appreciated by the user are recommended, for example.

Furthermore, for example, in a case of the appreciation pattern "F", the determination unit 53c determines the mode of the guide such that a schematic explanation is prioritized over a detailed explanation for the corresponding user. The schematic explanation includes, for example, an outline and the historical background of the exhibit P, explanation in a case where the exhibit P is looked at from a distance, and the like. Furthermore, in the case of the appreciation pattern "F", the determination unit 53c determines the mode of the guide such that the exhibit P to be looked at next by the user and the like are recommended, for example.

Furthermore, for example, in a case of the appreciation pattern "B", the determination unit 53c determines the mode of the guide such that a simple explanation is made for the corresponding user. Furthermore, when the user continues to stop, the determination unit 53c determines the mode of the guide such that explanation is detailed. Furthermore, in the case of the appreciation pattern "B", the determination unit 53c determines the mode of the guide such that a general-purpose recommendation is made or such that a recommendation is not particularly made, for example.

Note that, if the user requests a guide in any mode, the mode is prioritized over a mode of the guide determined by the determination unit 53c.

The description returns to FIG. 8. The guide control unit 53d executes guide control on each guide terminal 30 in accordance with the mode of the guide determined by the determination unit 53c. Specifically, the guide control unit 53d generates an instruction signal in accordance with the mode of the guide determined by the determination unit 53c, and transmits the instruction signal to the guide terminal 30 via the communication unit 51. The guide terminal 30 gives a guide to the user by the mode of the guide and modal presentation in accordance with the instruction signal.

By the way, the appreciation pattern of each user is not necessarily fixed. Therefore, the determination unit 53c may change the mode of the guide following time-series changes of the appreciation pattern of the user.

Figure 15:
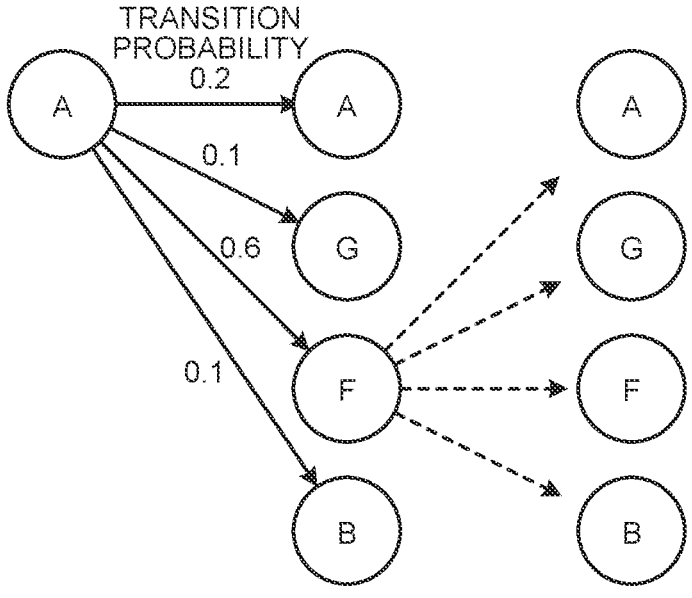
FIG. 15 is an explanatory diagram in a case where a mode of a guide is changed in accordance with time-series changes of an appreciation pattern.

FIG. 15 is an explanatory diagram in a case where the mode of the guide is changed in accordance with the time-series changes of the appreciation pattern. In such a case, for example, as illustrated in FIG. 15, the estimation unit 53b calculates a transition probability of transition to each appreciation pattern by using an algorithm of Bayesian estimation based on the changing state of the user.

Note that, in general, the user is most likely to maintain the previous appreciation pattern. When the previous appreciation pattern is maintained, the determination unit 53c continues the mode of the guide determined in accordance with the previous appreciation pattern.

Furthermore, when the transition probability has a value equal to or more than a certain value, the determination unit 53*c* changes the mode of the guide such that whether a transition to the appreciation pattern is actually made can be confirmed. For example, the determination unit 53*c* intentionally presents the mode of the guide corresponding to another appreciation pattern on a trial basis, and formally determines the mode of the guide in accordance with reaction of the user. Furthermore, when the transition probability changes to have a value more than the above-described value equal to or more than a certain value, the determination unit 53*c* determines the mode of the guide in accordance with the changed appreciation pattern without performing confirmation.

For example, when the largest transition probability is less than 0.2, the determination unit 53*c* continues the mode of the guide in accordance with the previous appreciation pattern. Furthermore, when the largest transition probability is equal to or more than 0.2 and less than 0.5, the determination unit 53*c* confirms whether a recommendation to the user is desired, for example. Furthermore, when the largest transition probability is equal to or more than 0.5, the determination unit 53*c* determines the mode of the guide in accordance with the changed appreciation pattern. In the example of FIG. 15, the determination unit 53*c* changes the mode of the guide from the mode corresponding to the estimation pattern "A" to the mode corresponding to the estimation pattern "F".

<2-4. Modal Presentation Control>

Figure 16:
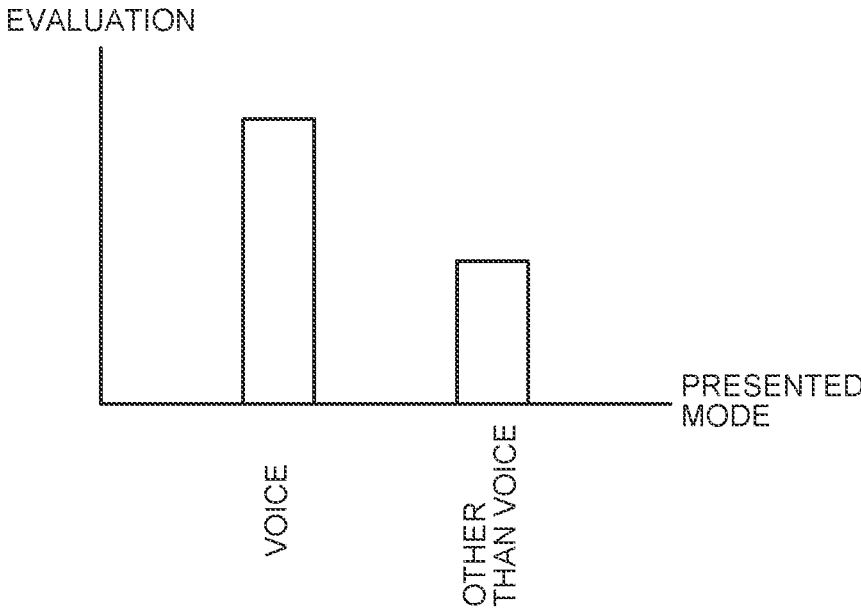
FIG. 16 illustrates the relation between a presented mode and evaluation for an appreciated object.

By the way, through a preliminary experiment, the applicant has obtained a result that there is a difference between evaluations of the user for an appreciated object depending on a difference between modes presented to the user. FIG. 16 illustrates the relation between a presented mode and evaluation for an appreciated object.

First, explanation tends to improve the evaluation of the user for an appreciated object. Furthermore, even in a case of explanation of the same contents, as illustrated in FIG. 16, presentation based on voice has more improved evaluation than presentation based on other than voice. The presentation based on voice is evaluated as being easily understood and having higher reliability than the presentation based on other than voice.

That is, it is known that change of the mode may influence the evaluation of the same appreciated object. Thus, in the embodiment of the present disclosure, modal presentation control is performed in consideration of such a point.

FIG. 17 is an explanatory diagram of the modal presentation control based on guide types. Furthermore, FIG. 18 is an explanatory diagram of the modal presentation control based on an organizer intention.

First, as illustrated in FIG. 17, the determination unit 53*c* selects a presented mode in accordance with a guide type of a guide to be given to the user. For example, when the guide type is "work explanation", the determination unit 53*c* selects "voice" as the presented mode, and causes the guide terminal 30 to perform the work explanation based only on voice.

Note that, when an explanation is not easily understood only by voice, for example, when a specific place or position of the exhibit P is desired to be pointed, a line of sight of the user may be led by using text and a symbol as a supplementary mode.

As illustrated in FIG. 17, the appreciation pattern "A" is easily adapted in a case where the presented mode is centered on voice. In the case of the appreciation pattern "A", the determination unit 53*c* determines the mode of the guide such that a detailed explanation is made centered mainly on voice to the corresponding user. Furthermore, in order for the user to concentrate on appreciation, the determination unit 53*c* determines the mode of the guide such that an avatar is not used. Furthermore, in the case of the appreciation pattern "A", the user appreciates the exhibit P faithfully along the route. The determination unit 53*c* thus determines the mode of the guide such that a guide regarding the movement route is not given.

Furthermore, when the guide type is "floor guidance", the determination unit 53*c* selects "avatar" as the presented mode, and causes the guide terminal 30 to perform floor guidance performed by an avatar. A mode other than the avatar is appropriately selected as the supplementary mode.

As illustrated in FIG. 17, the appreciation pattern "F" is easily adapted in such a case. In the case of the appreciation pattern "F", the user tends not to approach the exhibit P much. The determination unit 53*c* thus determines the mode of the guide such that the avatar is mainly in charge of floor movement and area explanation.

Furthermore, in a case where the guide type is "companion appreciation", the determination unit 53*c* selects "avatar" as the presented mode, and causes the guide terminal 30 to perform the companion appreciation. In the companion appreciation, an avatar accompanies the user, and enjoys the interest of the user together. The supplementary mode is particularly unnecessary.

As illustrated in FIG. 17, the appreciation pattern "G" is easily adapted in such a case. In the case of the appreciation pattern "G", the user tends to skip the exhibit P of no interest regardless of the route. The determination unit 53*c* gives the initiative of selecting an appreciated object to the user. The determination unit 53*c* causes the avatar to perform work explanation of the exhibit P at the position where the user has stopped only when a user request is made. The avatar may appropriately perform the floor movement and the area explanation.

Furthermore, when the guide type is "request response", that is, in a case of a guide in which any user request is responded each time, the determination unit 53*c* selects "avatar" as the presented mode, and causes the guide terminal 30 to perform the request response. In the request response, an avatar is called only when a user request is made, and gives a guide. The supplementary mode is particularly unnecessary.

As illustrated in FIG. 17, the appreciation pattern "B" is easily adapted in such a case. In the case of the appreciation pattern "B", the state of the user is not easily predicted. The avatar is preferably caused to appear each time a user request is made.

Furthermore, as illustrated in FIG. 18, the determination unit 53*c* can select "voice" as the presented mode for a "notable work", and cause the guide terminal 30 to perform work explanation based only on voice. The notable work is a work which the organizer particularly desires to be highly evaluated or appreciated with concentration. The "notable work" is, for example, the exhibit P that is not famous but that the organizer desires to be paid attention to by the user and the exhibit P of which the organizer desires to put an effort into selling related goods. For example, even when avatar is set as the presented mode, the determination unit 53*c* can set only voice as the presented mode for such a notable work.

<2-5. Accessibility Support>

By the way, in general, the user may have visual impairment or hearing impairment. Thus, in such a case, the determination unit 53*c* can determine the mode of the guide such that a presented mode in accordance with impairment of the user is selected.

FIG. 19 is an explanatory diagram (part 1) of accessibility support. Furthermore, FIG. 20 is an explanatory diagram (part 2) of the accessibility support.

Whether or not the user has visual impairment or hearing impairment can be registered to the above-described user information DB 52*d* preliminarily or at the time of entrance, for example. The determination unit 53*c* refers to the user information DB 52*d*. As illustrated in FIG. 19, for example, when the user has visual impairment, the determination unit 53*c* selects voice as the presented mode. Furthermore, similarly, when the user has hearing impairment, the determination unit 53*c* selects other than voice as the presented mode.

This enables an optimum presented mode in accordance with impairment of the user to be selected, and enables the guide terminal 30 to give a guide in the presented mode.

Furthermore, a user who has difficulty in viewing or hearing in a certain situation although the user is not registered in the user information DB 52*d* as having impairment or does not receive impairment recognition is also assumed.

In such a case, for example, when a guide is given in a predetermined presented mode but assumed reaction is not obtained from the user, the determination unit 53*c* can change the presented mode. When the reaction is obtained, the determination unit 53*c* can continue to give a guide in the changed presented mode.

Specifically, as illustrated in FIG. 19, for example, when the user reacts well to "voice", which is the predetermined presented mode, the determination unit 53*c* continues the presented mode as voice. In contrast, when the user reacts poorly such as the user does not see the direction of explanation based on voice, the determination unit 53*c* switches the presented mode from voice to other than voice.

Furthermore, for example, when the user reacts well to "other than voice", which is the predetermined presented mode, the determination unit 53*c* continues the presented mode as other than voice. In contrast, when the user reacts poorly such as the user hesitates to, for example, floor guidance based on other than voice, the determination unit 53*c* switches the presented mode from other than voice to voice.

This enables an optimum presented mode in accordance with a situation to be selected for the user who has difficulty in viewing or hearing in a certain situation although the user is not registered in the user information DB 52*d* as having impairment or does not receive impairment recognition, and enables the guide terminal 30 to give a guide in the presented mode.

<2-6. Processing Procedure>

Figure 21:
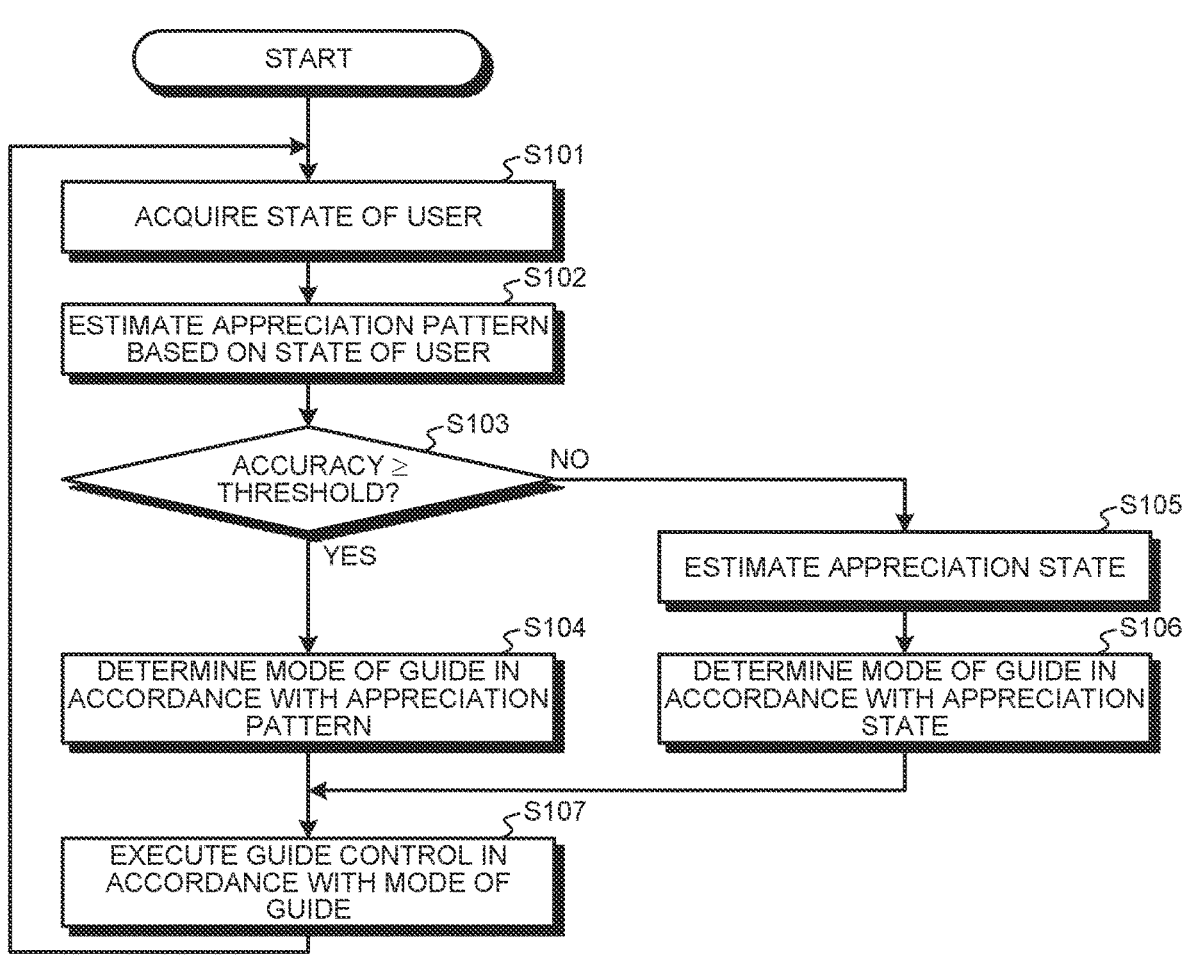
FIG. 21 is a flowchart illustrating a processing procedure executed by the server device.

Next, a processing procedure executed by the server device 50 will be described with reference to FIG. 21. FIG. 21 is a flowchart illustrating the processing procedure executed by the server device 50.

As illustrated in FIG. 21, first, the acquisition unit 53*a* acquires the state of the user from the in-facility sensor unit 10 and the in-terminal sensor unit 32 (Step S101). Then, the estimation unit 53*b* estimates an appreciation pattern based on the acquired state of the user (Step S102).

Note that the estimation unit 53*b* determines whether or not the accuracy of the estimated appreciation pattern is equal to or more than a predetermined threshold (Step S103). When the accuracy is equal to or more than the predetermined threshold (Step S103, Yes), the determination unit 53*c* determines the mode of a guide to the user in accordance with the estimated appreciation pattern (Step S104).

In contrast, when the accuracy is less than the predetermined threshold (Step S103, No), the estimation unit 53*b* estimates the appreciation state of the user based on the state of the user (Step S105), and the determination unit 53*c* determines the mode of the guide to the user in accordance with the estimated appreciation state (Step S106).

Then, the guide control unit 53*d* executes guide control on the guide terminal 30 in accordance with the determined mode of the guide (Step S107). Then, the server device 50 repeats the processing from Step S101.

3. Variations

Note that the above-described embodiment can include some variations.

<3-1. Content Accumulation of Guide Terminal>

Although the guide terminal 30 ideally accumulates guide content covering all modes in the guide content DB 36*a*, the guide terminal 30 may have a limited storage capacity.

Therefore, the guide terminal 30 preferably acquires guide content from the server device 50, as necessary. If guide content is acquired each time the appreciation pattern changes, however, a delay may occur.

Thus, the server device 50 may select guide content to which transition is likely to be performed in consideration of the current appreciation pattern of the user based on, for example, the above-described pattern history DB 52*c*, and preliminarily distribute the guide content to the guide terminal 30. This can reduce the possibility of the occurrence of a delay without wasting the storage capacity of the guide terminal 30.

<3-2. Leading to Appreciation Pattern>

Furthermore, the user may be led so as to take an action from in the current appreciation pattern of the user to in a desired appreciation pattern in accordance with, for example, an organizer intention or a degree of congestion of a facility.

Figure 22:
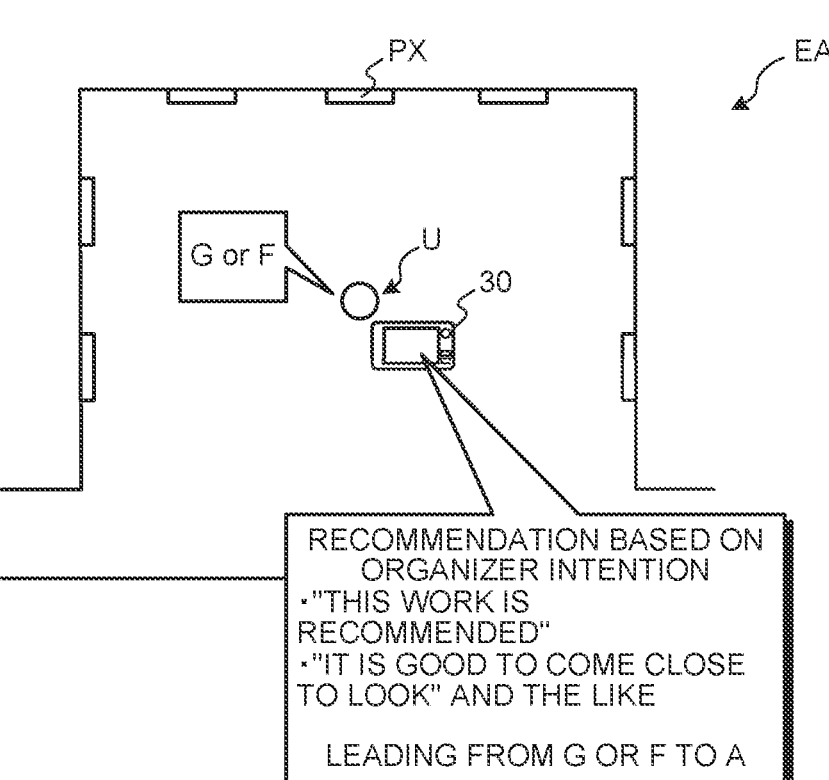
FIG. 22 is an explanatory diagram of leading processing based on the organizer intention.
Figure 23:
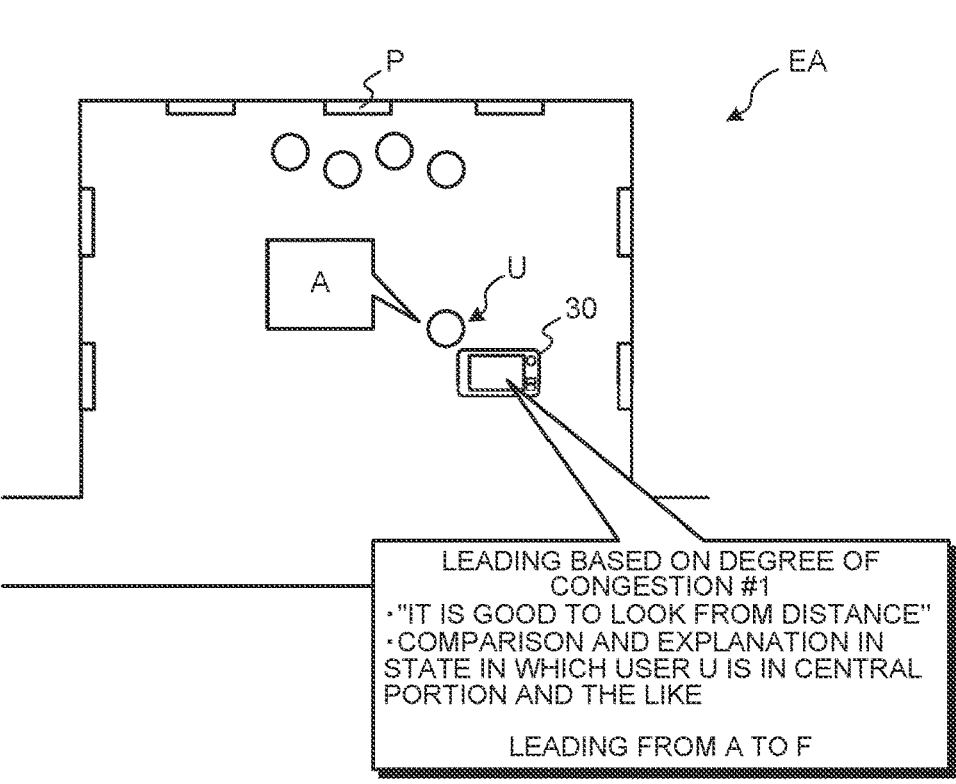
FIG. 23 is an explanatory diagram (part 1) of the leading processing based on a degree of congestion.
Figure 24:
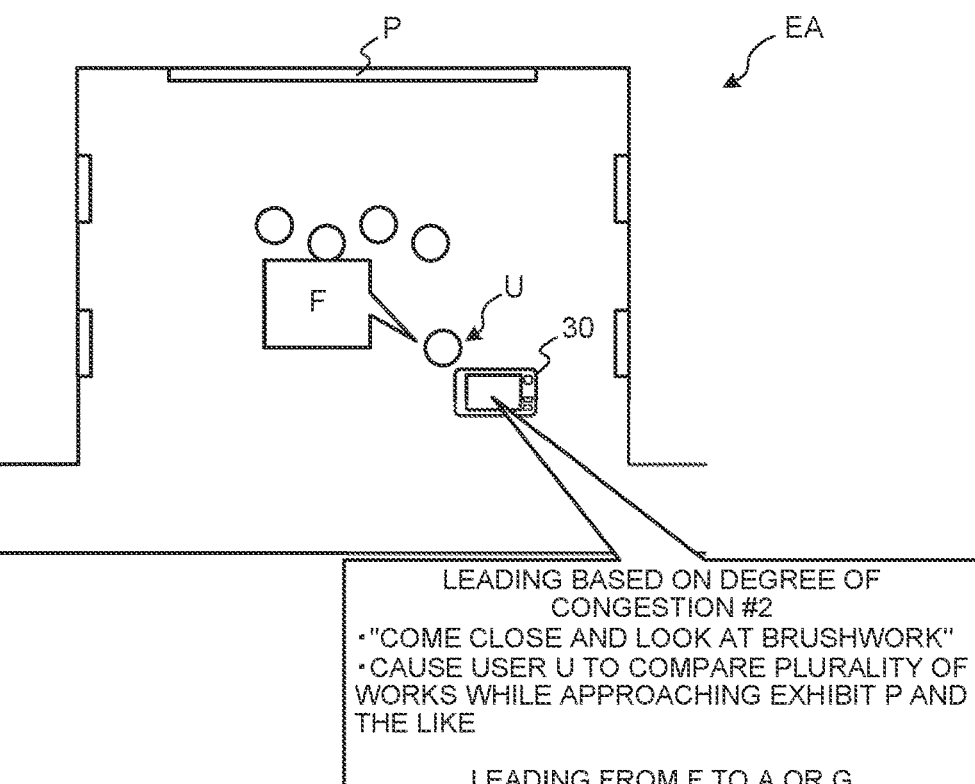
FIG. 24 is an explanatory diagram (part 2) of the leading processing based on the degree of congestion.
Figure 25:
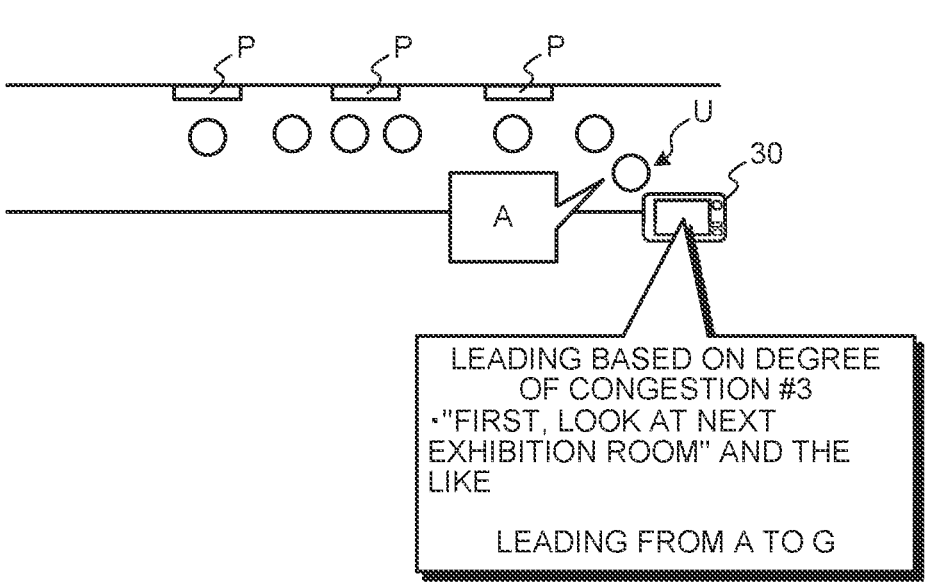
FIG. 25 is an explanatory diagram (part 3) of the leading processing based on the degree of congestion.

FIG. 22 is an explanatory diagram of leading processing based on the organizer intention. Furthermore, FIG. 23 is an explanatory diagram (part 1) of the leading processing based on the degree of congestion. Furthermore, FIG. 24 is an explanatory diagram (part 2) of the leading processing based on the degree of congestion. Furthermore, FIG. 25 is an explanatory diagram (part 3) of the leading processing based on the degree of congestion.

As illustrated in FIG. 22, there is a notable work PX strongly recommended by the above-described organizer. Then, the appreciation pattern of a user U is "G" or "F". That is, the user tends to skip the exhibit P or look at the exhibit P from a distance.

In such a case, the determination unit 53*c* determines the mode of the guide such that a recommendation is made based on the organizer intention, for example. As illustrated in the figure, the recommendation in such a case includes, for example, "This work is recommended" and "It is good to come close to look". That is, in the case, the determination unit 53*c* leads the user in the appreciation pattern "G" or "F" to take an action in the appreciation pattern "A".

This can increase the possibility that the user U, who is originally not likely to approach the notable work PX, approaches the notable work PX based on the organizer intention.

Furthermore, as illustrated in FIG. 23, the appreciation pattern of the user U is "A", and the vicinity of a certain exhibit P is crowded. Originally, the user U desires to approach the exhibit P, and appreciate the exhibit P in detail over time.

In such a case, as illustrated in the figure, the determination unit 53c determines the mode of the guide such that a recommendation of "It is good to look from a distance" is made, for example. Furthermore, as illustrated in the figure, the determination unit 53c determines the mode of the guide such that comparison with another exhibit P, explanation, and the like are made in a state in which the user U is in the central portion of the exhibition area EA, for example. That is, in the case, the determination unit 53c leads the user in the appreciation pattern "A" to take an action in the appreciation pattern "F".

This enables the user U who originally desires to approach and appreciate the exhibit P to enjoy appreciation without approaching the exhibit P.

Furthermore, as illustrated in FIG. 24, the appreciation pattern of the user U is "F", but the central portion of the exhibition area EA is crowded. Such a situation may occur, for example, when the exhibit P is a large work. Originally, the user U desires to appreciate the exhibit P from a distance near the central portion.

In such a case, as illustrated in the figure, the determination unit 53c determines the mode of the guide such that a recommendation of "Come close and look at the brushwork" is made, for example. Furthermore, as illustrated in the figure, the determination unit 53c determines the mode of the guide such that the user U is caused to compare a plurality of works approaching the exhibit P, for example. That is, in the case, the determination unit 53c leads the user in the appreciation pattern "F" to take an action in the appreciation pattern "A" or "G".

This makes it possible to give the user U who originally desires to appreciate the exhibit P from a distance an opportunity to approach the exhibit P and enjoy appreciation at a new attention point for the user U such as brushwork in a case of a painting and the like.

Furthermore, in FIG. 25, although the appreciation pattern of the user U is "A", the exhibition area is narrow due to the structure of the facility, the vicinity of any exhibit P is crowded, and there is no space to look at the exhibit P from a distance. Originally, the user U desires to approach the exhibit P, and appreciate the exhibit P in detail over time.

In such a case, as illustrated in the figure, the determination unit 53c determines the mode of the guide such that a recommendation of "First, look at the next exhibition room" is made, for example. That is, in the case, the determination unit 53c leads the user in the appreciation pattern "A" to take an action in the appreciation pattern "G".

This enables the user U who originally desires to appreciate the exhibit P approaching the exhibit P along the route to change the route and enjoy appreciation, and enables the user to enjoy appreciation approaching the exhibit P again at the time when the congestion is alleviated later.

<3-3. Utterance Instruction Support>

Furthermore, it has been already described that the guide terminal 30 can receive an utterance instruction of a user. The utterance instruction may contain a rough expression using a pronoun and the like, but meanwhile, the utterance instruction may contain a limiting expression to some extent.

Figure 26:
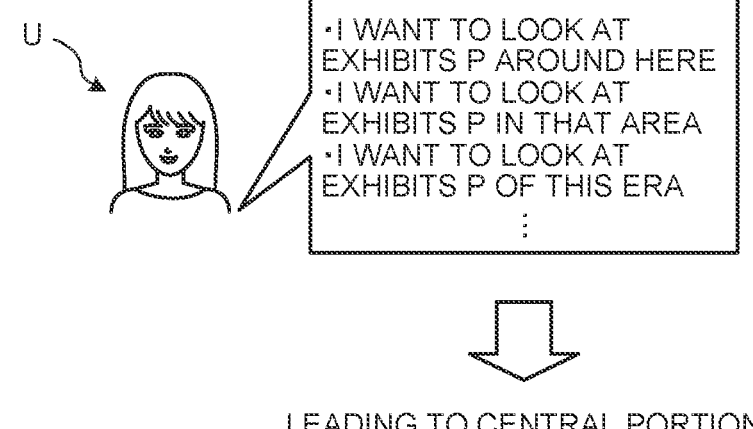
FIG. 26 is an explanatory diagram (part 1) of utterance instruction support.
Figure 27:
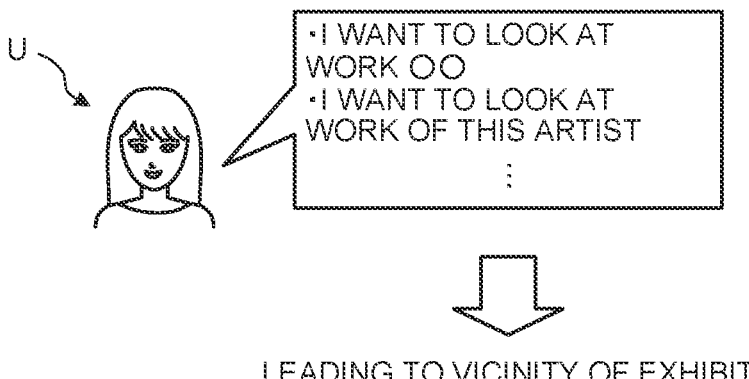
FIG. 27 is an explanatory diagram (part 2) of the utterance instruction support.

FIG. 26 is an explanatory diagram (part 1) of the utterance instruction support. Furthermore, FIG. 27 is an explanatory diagram (part 2) of the utterance instruction support. As illustrated in FIG. 26, for example, the user U requests work explanation in expressions collecting exhibits P together, such as "I want to look at exhibits P around here" "I want to look at exhibits P in that area", and "I want to look at exhibits P of this era".

In such a case, the determination unit 53c determines the mode of the guide such that the user U is led to the central portion of the exhibition area EA and comprehensive work explanation is made in accordance with a rough expression recognized as a result of voice recognition, for example.

This enables the user U to enjoy appreciation of a work group in accordance with rough expressions uttered by the user U in a comprehensive manner.

In contrast, as illustrated in FIG. 27, for example, the user U requests work explanation in expressions that limit the exhibits P to some extent, such as "I want to look at a work ○○" and "I want to look at a work of this artist".

In such a case, the determination unit 53c determines the mode of the guide such that the user U is led to the vicinity of the corresponding exhibit P and a detailed work explanation is made in accordance with the limiting expressions recognized as a result of voice recognition, for example.

This enables the user U to enjoy appreciation of a work in accordance with limiting expressions uttered by the user U more closely or in detail.

<3-4. Timing of Switching Mode of Guide>

Figure 28:
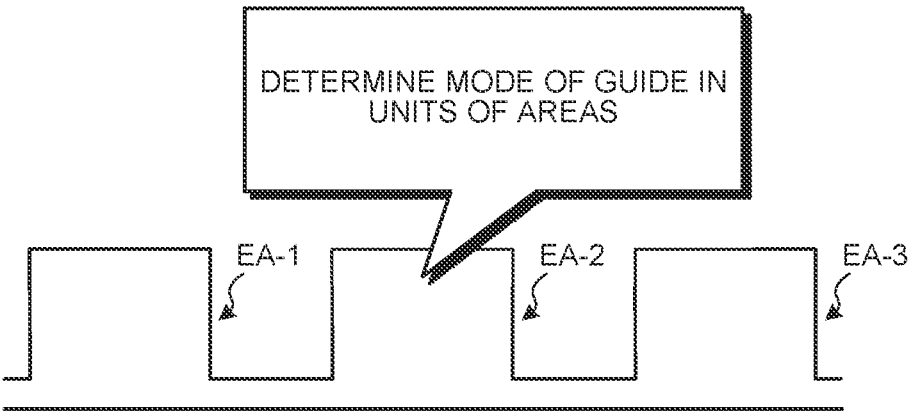
FIG. 28 is an explanatory diagram of timing of switching a mode of a guide.

Next, FIG. 28 is an explanatory diagram of timing of switching the mode of the guide. When the appreciation pattern of the user changes, for example, if the mode of the guide is frequently switched in response to the change, confusion may be predicted. For example, there are a case of congestion and a case where one appreciation pattern has been continued for a long time.

In such a case, as illustrated in FIG. 28, the determination unit 53c determines and switches the mode of the guide for the constantly estimated appreciation pattern of the user in units of, for example, the exhibition areas EA. That is, in the same exhibition area EA, a guide is given to the user in the same mode.

This can prevent the above-described confusion. This enables a guide to be given to the user in the same mode in at least the same exhibition area EA, and enables the user to stably enjoy appreciation.

<3-5. Avatar>

Figures 29, 30:
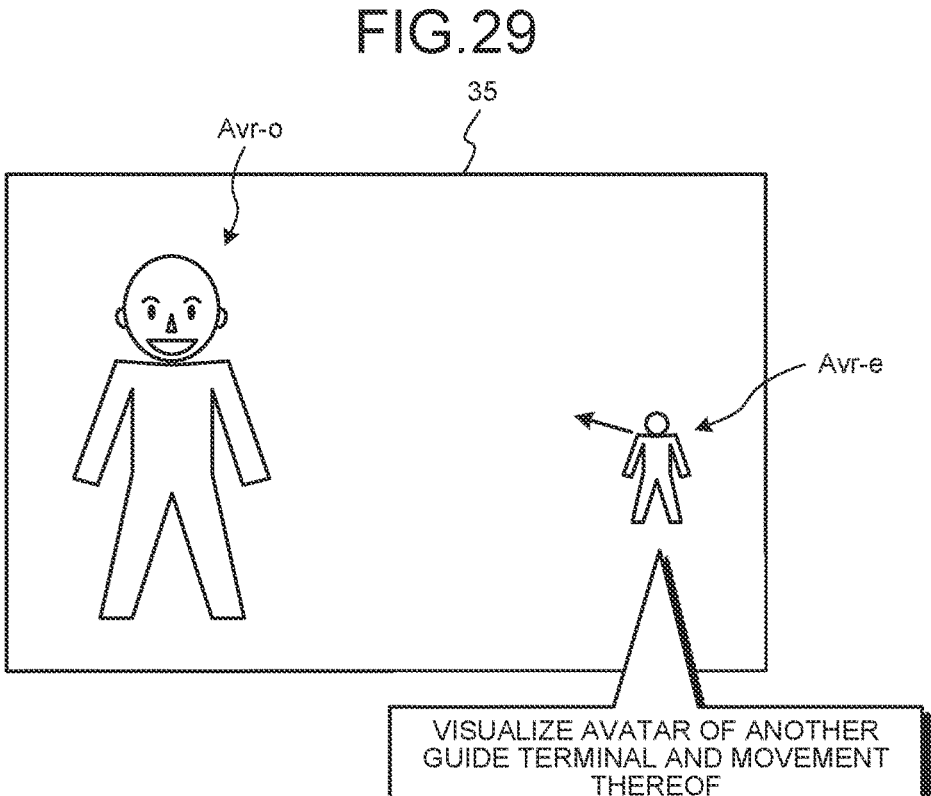
FIG. 29 is an explanatory diagram (part 1) of a variation of an avatar.
FIG. 30 is an explanatory diagram (part 2) of a variation of the avatar.

Next, FIG. 29 is an explanatory diagram (part 1) of a variation of the avatar Avr. Furthermore, FIG. 30 is an explanatory diagram (part 2) of a variation of the avatar Avr. Note that, in the description using FIGS. 29 and 30, a case where the guide terminal 30 is AR glasses is assumed.

As illustrated in FIG. 29, when the avatar Avr is presented as a mode, an avatar Avr-o may be presented on the display unit 35 of a host terminal, and an avatar Avr-e presented to another guide terminal 30 and movement thereof may be visualized.

This enables the user to take an appreciation action in accordance with movement of another user other than the user himself/herself. For example, when the user in the appreciation pattern "A" does not want to be disturbed in appreciation by another user, the user can avoid the exhibit P that is likely to be crowded, and easily take an appreciation action in accordance with the appreciation pattern and preference of the user himself/herself.

Furthermore, as illustrated in FIG. 30, when the exhibit P is appreciated through the guide terminal 30 which is AR glasses, the visibility of the avatar Avr may be deteriorated. As illustrated in the figure, the deterioration in visibility includes, for example, reduction, brightness reduction, invisibility, and position movement.

This can prevent the avatar Avr from being superimposed on the exhibit P and making the exhibit P difficult to see. Furthermore, this can prevent the brightness of the avatar Avr from disturbing appreciation in a case of low surrounding brightness. Furthermore, when it can be detected that the user is concentrating on appreciation of the exhibit P, the brightness of the avatar Avr may be lowered. Furthermore, the invisibility may include displaying only the outline of the avatar Avr or making the outline transparent.

Furthermore, although, in the above-described embodiment, a case where an algorithm of Bayesian estimation is used for transition estimation of an appreciation pattern has been described in an example, this is merely one example, and an algorithm to be used is not limited. Furthermore, the pattern estimation model 52b is not necessarily used for estimating the appreciation pattern. The appreciation pattern may be estimated by pattern matching based on image analysis or the like.

Furthermore, among pieces of processing described in the above-described embodiment, all or part of processing described as being performed automatically can be performed manually, or all or part of processing described as being performed manually can be performed automatically by a known method. In addition, the processing procedures, specific names, and information including various pieces of data and parameters in the above document and drawings can be optionally changed unless otherwise specified. For example, various pieces of information in each figure are not limited to the illustrated information.

Furthermore, each component of each illustrated device is functional and conceptual, and does not necessarily need to be physically configured as illustrated. That is, the specific form of distribution/integration of each device is not limited to the illustrated one, and all or part of the device can be configured in a functionally or physically distributed/integrated manner in any unit in accordance with various loads and use situations.

For example, the guide terminal 30 may include some or all of processing units of the control unit 53 of the server device 50, and the guide terminal 30 may implement or execute some or all of the functions and effects of information processing executed by the control unit 53 of the server device 50.

Furthermore, the above-described embodiment can be appropriately combined in a region where the processing contents do not contradict each other. Furthermore, the order of steps in the sequence diagrams or the flowcharts of the embodiment can be appropriately changed.

4. Hardware Configuration

Figure 31:
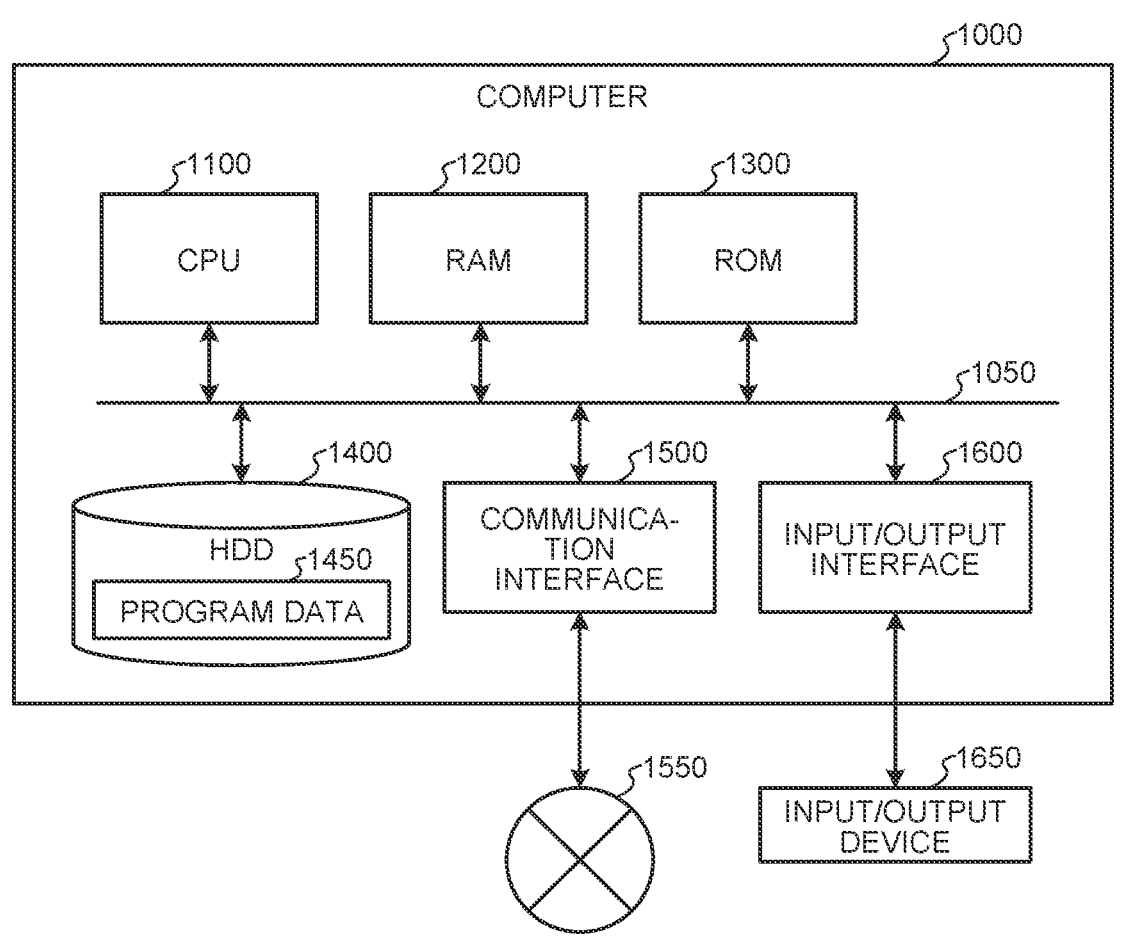
FIG. 31 is a hardware configuration diagram illustrating one example of a computer that implements the function of the server device.

The guide terminal 30 and the server device 50 according to the above-described embodiment are implemented by a computer 1000 having a configuration as illustrated in FIG. 31, for example. The server device 50 will be described in an example. FIG. 31 is a hardware configuration diagram illustrating one example of the computer 1000 that implements the function of the server device 50. The computer 1000 includes a CPU 1100, a RAM 1200, a ROM 1300, a storage 1400, a communication interface 1500, and an input/output interface 1600. Units of the computer 1000 are connected by a bus 1050.

The CPU 1100 operates based on a program stored in the ROM 1300 or the storage 1400, and controls each unit. For example, the CPU 1100 develops a program stored in the ROM 1300 or the storage 1400 on the RAM 1200, and executes processing corresponding to various programs.

The ROM 1300 stores a boot program such as a basic input output system (BIOS) executed by the CPU 1100 at the time when the computer 1000 is started, a program depending on the hardware of the computer 1000, and the like.

The storage 1400 is a computer-readable recording medium that non-transiently records a program executed by the CPU 1100, data used by the program, and the like. Specifically, the storage 1400 is a recording medium that records an information processing program according to the present disclosure. The information processing program is one example of program data 1450.

The communication interface 1500 connects the computer 1000 with an external network 1550. For example, the CPU 1100 receives data from another device, and transmits data generated by the CPU 1100 to another device via the communication interface 1500.

The input/output interface 1600 connects an input/output device 1650 with the computer 1000. For example, the CPU 1100 can receive data from an input device such as a keyboard and a mouse via the input/output interface 1600. Furthermore, the CPU 1100 can transmit data to an output device such as a display, a speaker, and a printer via the input/output interface 1600. Furthermore, the input/output interface 1600 may function as a medium interface that reads a program and the like recorded in a predetermined recording medium. The medium includes, for example, an optical recording medium such as a digital versatile disc (DVD) and a phase change rewritable disk (PD), a magneto-optical recording medium such as a magneto-optical disk (MO), a tape medium, a magnetic recording medium, a semiconductor memory, and the like.

For example, when the computer 1000 functions as the server device 50 according to the embodiment of the present disclosure, the CPU 1100 of the computer 1000 implements the functions of the control unit 53 by executing an information processing program loaded on the RAM 1200. Furthermore, the storage 1400 stores an information processing program according to the present disclosure and data in the storage unit 52. Note that the CPU 1100 reads the program data 1450 from the storage 1400 and executes the program data 1450. In another example, the CPU 1100 may acquire these programs from another device via the external network 1550.

5. Conclusion

As described above, according to one embodiment of the present disclosure, the server device 50 (corresponding to one example of "information processing apparatus") includes: the acquisition unit 53a that acquires a state of a user who appreciates the exhibit P (corresponding to one example of "appreciated object"); the estimation unit 53b that estimates an appreciation pattern, which is a type of an appreciation style of the user, based on the state of the user acquired by the acquisition unit 53a; the determination unit 53c that determines a mode of a guide regarding the exhibit P presented to the user in accordance with the appreciation pattern estimated by the estimation unit 53b; and the guide control unit 53d that executes guide control in which control is performed such that the guide is presented to the user in accordance with the mode of the guide determined by the determination unit 53c. This enables a guide to be given in accordance with the state and preference of the user.

Although the embodiment of the present disclosure has been described above, the technical scope of the present disclosure is not limited to the above-described embodiment as it is, and various modifications can be made without departing from the gist of the present disclosure. Furthermore, components of different embodiments and variations may be appropriately combined.

Furthermore, the effects in the embodiment described in the present specification are merely examples and not limitations. Other effects may be exhibited.

Note that the present technology can also have the configurations as follows.

(1)

An information processing apparatus comprising:

an acquisition unit that acquires a state of a user who appreciates an appreciated object;

an estimation unit that estimates an appreciation pattern, which is a type of an appreciation style of the user, based on the state of the user acquired by the acquisition unit;

a determination unit that determines a mode of a guide regarding the appreciated object presented to the user in accordance with the appreciation pattern estimated by the estimation unit; and a guide control unit that executes guide control in which control is performed such that the guide is presented to the user in accordance with the mode of the guide determined by the determination unit.

(2)

The information processing apparatus according to (1), wherein, when accuracy of the appreciation pattern that has been estimated is less than a predetermined threshold, the estimation unit estimates an appreciation state of the user to the appreciated object based on the state of the user, and the determination unit determines the mode of the guide in accordance with the appreciation state estimated by the estimation unit.

(3)

The information processing apparatus according to (1), wherein, when the accuracy of the appreciation pattern that has been estimated is less than a predetermined threshold, the estimation unit regards the appreciation pattern as being a same as predetermined one of appreciation patterns.

(4)

The information processing apparatus according to (1), (2) or (3), wherein the estimation unit estimates the appreciation pattern assuming that the appreciation pattern is at least one of a first pattern of an ant type, a second pattern of a grasshopper type, a third pattern of a fish type, and a fourth pattern of a butterfly type.

(5)

The information processing apparatus according to (4), wherein, when the appreciation pattern is estimated to be the first pattern, the determination unit determines the mode of the guide such that all appreciated objects are explained in detail.

(6)

The information processing apparatus according to (5), wherein the determination unit determines the mode of the guide such that a degree of detail of explanation is changed in accordance with a speed of movement of the user.

(7)

The information processing apparatus according to (4), (5) or (6), wherein, when the appreciation pattern is estimated to be the second pattern, the determination unit determines the mode of the guide such that only an appreciated object at a position where the user has stopped is explained.

(8) The information processing apparatus according to any one of (4) to (7), wherein, when the appreciation pattern is estimated to be the third pattern, the determination unit determines the mode of the guide such that a schematic explanation is prioritized over a detailed explanation.

(9)

The information processing apparatus according to any one of (4) to (8), wherein, when the appreciation pattern is estimated to be the fourth pattern, the determination unit determines the mode of the guide such that a simple explanation is made.

(10)

The information processing apparatus according to any one of (1) to (9), wherein the guide control includes modal presentation control in which a mode presented to the user is controlled, and the determination unit selects the mode presented to the user in accordance with a guide type of the guide.

(11)

The information processing apparatus according to (10), wherein, when the guide type is work explanation, the determination unit selects voice as the mode.

(12)

The information processing apparatus according to (10) or (11), wherein the determination unit selects the mode presented to the user in accordance with any intention to the appreciated object.

(13)

The information processing apparatus according to (12), wherein, when the appreciated object is a notable work, the determination unit selects voice as the mode.

(14)

The information processing apparatus according to any one of (10) to (13), wherein, when the guide type is floor guidance, companion appreciation, or request response, the determination unit selects avatar as the mode.

(15)

The information processing apparatus according to any one of (1) to (14), wherein the determination unit changes the mode of the guide in accordance with a change in the appreciation pattern estimated by the estimation unit.

(16)

The information processing apparatus according to (15), wherein the determination unit changes the mode of the guide in units of exhibition areas for the appreciated objects.

(17)

The information processing apparatus according to any one of (1) to (16), wherein the determination unit leads the user to take an action in accordance with one of the appreciation patterns which are different from each other in accordance with a degree of congestion.

(18)

The information processing apparatus according to (17), wherein the determination unit leads the user to move away from the appreciated object when a vicinity of the appreciated object is crowded, and leads the user to approach the appreciated object when a position away from the appreciated object is crowded, and the determination unit further determines the mode of the guide in accordance with a position to which the user has been led.

(19)

The information processing apparatus according to any one of (10) to (18), wherein, when the user has impairment, the determination unit selects the mode presented to the user in accordance with a type of the impairment.

(20)

An information processing method comprising:

acquiring a state of a user who appreciates an appreciated object;

estimating an appreciation pattern, which is a type of an appreciation style of the user, based on the state of the user acquired by the acquiring;

determining a mode of a guide regarding the appreciated object presented to the user in accordance with the appreciation pattern estimated by estimating; and executing guide control in which control is performed such that the guide is presented to the user in accordance with the mode of the guide determined by the determining.

REFERENCE SIGNS LIST

1 INFORMATION PROCESSING SYSTEM
30 GUIDE TERMINAL
31 OPERATION UNIT
32 IN-TERMINAL SENSOR UNIT
33 COMMUNICATION UNIT
34 VOICE OUTPUT UNIT
35 DISPLAY UNIT
36 STORAGE UNIT
37 CONTROL UNIT
37a ACQUISITION UNIT
37b TRANSMISSION UNIT
37c OUTPUT CONTROL UNIT
50 SERVER DEVICE
51 COMMUNICATION UNIT
52 STORAGE UNIT
53 CONTROL UNIT
53a ACQUISITION UNIT
53b ESTIMATION UNIT
53c DETERMINATION UNIT
53d GUIDE CONTROL UNIT
EA EXHIBITION AREA
P EXHIBIT
PX NOTABLE WORK

The invention claimed is:

1. An information processing apparatus, comprising:
a central processing unit (CPU) configured to:
acquire a state of a user, wherein
an appreciated object of a plurality of appreciation objects is associated with appreciation of the user, and
the acquired state of the user is based on sensor data;
generate a label value of a plurality of label values based on the acquired state of the user;
determine an accuracy of the generated label value based on a machine learning model;
determine a first appreciation pattern of a plurality of appreciation patterns based on
the state of the user, and the determined accuracy of the generated label value that is equal to or greater than a first threshold, wherein
the plurality of label values is associated with the plurality of appreciation patterns,
the first appreciation pattern is a type of an appreciation style of the user, and
the first appreciation pattern corresponds to the generated label value;
determine a mode of a guide based on the first appreciation pattern, wherein the mode of the guide is associated with the appreciated object presented to the user;
generate an instruction signal based on the mode of the guide; and
execute, based on the instruction signal, a guide control process to control a guide terminal, wherein the guide terminal outputs the guide to the user based on the mode of the guide.

2. The information processing apparatus according to claim 1, wherein the CPU is further configured to:
determine an accuracy of the first appreciation pattern;
determine an appreciation state of the user associated with the appreciated object based on
the state of the user, and
the accuracy of the first appreciation pattern that is less than a second threshold, wherein the second threshold is different from the first threshold; and
determine the mode of the guide based on the appreciation state of the user.

3. The information processing apparatus according to claim 1, wherein the CPU is further configured to:
determine an accuracy of the first appreciation pattern; and
determine, based on the accuracy of the first appreciation pattern that is less than a second threshold, the first appreciation pattern as a second appreciation pattern of the plurality of appreciation patterns, wherein the second threshold is different from the first threshold.

4. The information processing apparatus according to claim 1, wherein the first appreciation pattern is at least one of a first pattern of an ant type, a second pattern of a grasshopper type, a third pattern of a fish type, and a fourth pattern of a butterfly type.

5. The information processing apparatus according to claim 4, wherein, based on the first appreciation pattern that corresponds to the first pattern, the CPU is further configured to determine the mode of the guide such that the plurality of appreciated objects is explained in detail.

6. The information processing apparatus according to claim 5, wherein the CPU is further configured to determine, based on a speed of movement of the user, the mode of the guide such that a degree of detail of explanation is changed.

7. The information processing apparatus according to claim 4, wherein
based on the first appreciation pattern that corresponds to the second pattern, the CPU is further configured to determine the mode of the guide such that the appreciated object is explained, and
the appreciated object is at a position where the user has stopped.

8. The information processing apparatus according to claim 4, wherein, based on the first appreciation pattern that corresponds to the third pattern, the CPU is further configured to determine the mode of the guide such that a schematic explanation is prioritized over a detailed explanation.

9. The information processing apparatus according to claim 4, wherein, based on the first appreciation pattern that corresponds to be the fourth pattern, the CPU is further configured to determine the mode of the guide such that an explanation is made.

10. The information processing apparatus according to claim 1, wherein the guide control process includes a modal presentation control process, and the CPU is further configured to:

control a mode presented to the user; and select the mode presented to the user based on a guide type of the guide.

11. The information processing apparatus according to claim 10, wherein the CPU is further configured to select voice as the mode based on the guide type that corresponds to work explanation.

12. The information processing apparatus according to claim 10, wherein the CPU is further configured to select the mode presented to the user based on an intention that is associated with the appreciated object.

13. The information processing apparatus according to claim 12, wherein the CPU is further configured to select voice as the mode based on the appreciated object that is a notable work.

14. The information processing apparatus according to claim 10, wherein the CPU is further configured to select avatar as the mode based on the guide type that is one of a floor guidance, a companion appreciation, or a request response.

15. The information processing apparatus according to claim 1, wherein the CPU is further configured to change the mode of the guide based on a change in the first appreciation pattern.

16. The information processing apparatus according to claim 15, wherein the CPU is further configured to change the mode of the guide, in units of exhibition areas, for the plurality of appreciated objects.

17. The information processing apparatus according to claim 1, wherein the CPU is further configured to output a notification to lead, based on one of the plurality of appreciation patterns, the user to take an action, and each of the plurality of appreciation patterns is different based on a degree of congestion.

18. The information processing apparatus according to claim 17, wherein the CPU is further configured to:

lead, based on a specific area that is crowded, the user to move to a first distance from the appreciated object, wherein the specific area surrounds the appreciated object;

lead, based on a first position that is crowded, the user to approach the appreciated object, wherein the first position is at a second distance from the appreciated object, and the second distance is different from the first distance; and determine the mode of the guide based on a second position, wherein the user is led to the second position, and the second position is different from the first position.

19. The information processing apparatus according to claim 10, wherein the CPU is further configured to unit select the mode presented to the user based on the user that is impaired, and a type of the impairment of the user.

20. An information processing method, comprising:

in an information processing apparatus:

acquiring a state of a user, wherein an appreciated object is associated with appreciation of the user, and the acquired state of the user is based on sensor data;

generating a label value of a plurality of label values based on the acquired state of the user;

determining an accuracy of the generated label value based on a machine learning model;

determining an appreciation pattern of a plurality of appreciation patterns based on the state of the user, and the determined accuracy of the generated label value that is equal to or greater than a threshold, wherein the plurality of label values is associated with the plurality of appreciation patterns, the appreciation pattern is a type of an appreciation style of the user, and the appreciation pattern corresponds to the generated label value;

determining a mode of a guide based on the appreciation pattern, wherein the mode of the guide is associated with the appreciated object presented to the user;

generating an instruction signal based on the mode of the guide; and executing, based on the instruction signal, a guide control process to control a guide terminal, wherein the guide terminal outputs the guide to the user based on the mode of the guide.

* * * * *